US012207020B2

(12) United States Patent
Shimomura

(10) Patent No.: US 12,207,020 B2
(45) Date of Patent: Jan. 21, 2025

(54) DATA DISTRIBUTION SYSTEM, SENSOR DEVICE, AND SERVER

(71) Applicant: Sony Semiconductor Solutions Corporation, Kanagawa (JP)

(72) Inventor: Munehiro Shimomura, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 1064 days.

(21) Appl. No.: 17/255,856

(22) PCT Filed: Nov. 12, 2019

(86) PCT No.: PCT/JP2019/044439
§ 371 (c)(1),
(2) Date: Dec. 23, 2020

(87) PCT Pub. No.: WO2020/100922
PCT Pub. Date: May 22, 2020

(65) Prior Publication Data
US 2021/0264164 A1 Aug. 26, 2021

Related U.S. Application Data

(60) Provisional application No. 62/869,749, filed on Jul. 2, 2019, provisional application No. 62/760,234, filed on Nov. 13, 2018.

(51) Int. Cl.
*H04N 7/18* (2006.01)
*G06N 20/00* (2019.01)
*G06V 20/52* (2022.01)

(52) U.S. Cl.
CPC .............. *H04N 7/181* (2013.01); *G06N 20/00* (2019.01); *G06V 20/52* (2022.01); *G06V 2201/07* (2022.01)

(58) Field of Classification Search
CPC ........ H04N 7/181; G06N 20/00; G06V 20/52; G06V 2201/07
See application file for complete search history.

(56) References Cited

U.S. PATENT DOCUMENTS

2014/0372561 A1* 12/2014 Hisano ................... H04L 47/10
709/217
2018/0063361 A1 3/2018 Goo
(Continued)

FOREIGN PATENT DOCUMENTS

CN 1805349 A 7/2006
CN 101071447 A 11/2007
(Continued)

OTHER PUBLICATIONS

Extended European Search Report dated Dec. 13, 2021 for corresponding European Application No. 19883686.8.
(Continued)

*Primary Examiner* — Pinalben Patel
(74) *Attorney, Agent, or Firm* — Michael Best & Friedrich LLP

(57) ABSTRACT

Provided is a data distribution system 1 including one or more sensor devices 10 to acquire sensing data and a server 20 to accept a distribution request from one or more requestors requesting distribution of predetermined data capable of being generated from the sensing data.

26 Claims, 14 Drawing Sheets

(56) References Cited

U.S. PATENT DOCUMENTS

| | | | |
|---|---|---|---|
| 2018/0121732 A1* | 5/2018 | Kim | G06F 18/214 |
| 2018/0151039 A1 | 5/2018 | Lemberger | |
| 2018/0181827 A1 | 6/2018 | Kim et al. | |
| 2018/0211115 A1* | 7/2018 | Klein | G08B 29/188 |
| 2018/0349708 A1* | 12/2018 | van Hoof | G08B 13/19684 |
| 2022/0300753 A1* | 9/2022 | Bapat | G08B 13/19697 |
| 2022/0391622 A1* | 12/2022 | de Steuben | G06V 10/751 |
| 2022/0414382 A1* | 12/2022 | Xiong | H04N 7/181 |
| 2023/0394686 A1* | 12/2023 | Min | G06V 10/751 |
| 2024/0005661 A1* | 1/2024 | Likhomanov | G06V 20/44 |

FOREIGN PATENT DOCUMENTS

| | | |
|---|---|---|
| CN | 102801957 A | 11/2012 |
| CN | 105574506 A | 5/2016 |
| CN | 107042824 A | 8/2017 |
| CN | 107770486 A | 3/2018 |
| CN | 107844551 A | 3/2018 |
| CN | 107925701 A | 4/2018 |
| JP | 2016-197314 A | 11/2016 |
| KR | 20170039465 A | 4/2017 |
| KR | 101768637 B1 | 8/2017 |
| WO | 2016118813 A1 | 7/2016 |

OTHER PUBLICATIONS

Manish Kushwaha et al.: "OASiS: A Programming Framework for Service-Oriented Sensor Networks", Communication Systems Software and Middleware, 2007. COMSWARE 2007. 2n d International Conference On, IEEE, PI, Jan. 1, 2007 (Jan. 1, 2007), pp. 1-8, XP031113929, ISBN: 978-1-4244-0613-5.

Jeffrey King et al.: "Atlas: A Service-Oriented Sensor Platform: Hardware and Middleware to Enable Programmable Pervasive Spaces", Local Computer Networks, Proceedings 2006 31 st IEEE Conference On, IEEE, PI, Nov. 1, 2006 (Nov. 1, 2006), pp. 630-638, XP031053978, ISBN: 978-1-4244-0418-6.

International Search Report, International Application No. PCT/JP2019/044439, dated Dec. 6, 2019.

Notification of Transmittal of the International Search Report and the Written Opinion of the International Searching Authority, or the Declaration (PCT/ISA/220), International Application No. PCT/JP2019/044439, dated Dec. 17, 2019.

Kato, Shingo, "Priority Control in Communication Networks for Predictive Information Delivery by Using Machine Learning", IEICE Technical Report, Jan. 11, 2018, vol. 117, No. 390, pp. 73-78.

* cited by examiner

FIG.6
IMAGE A
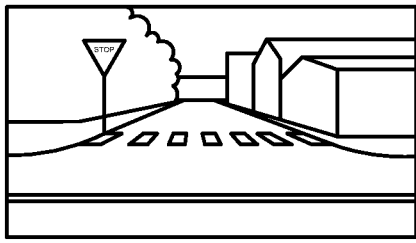
DISTRIBUTION DATA A
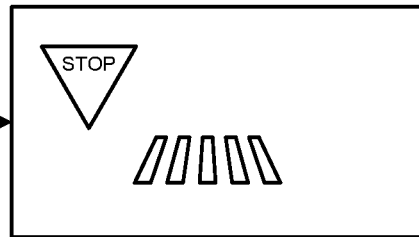
IMAGE B
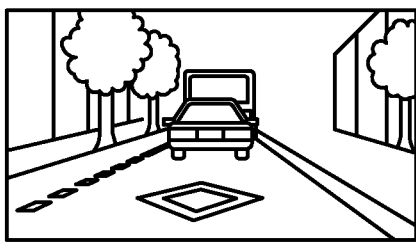
DISTRIBUTION DATA B
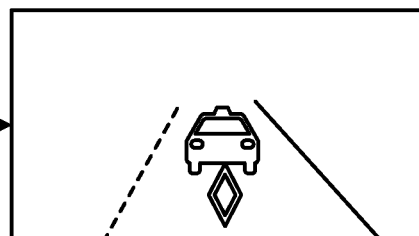
IMAGE C
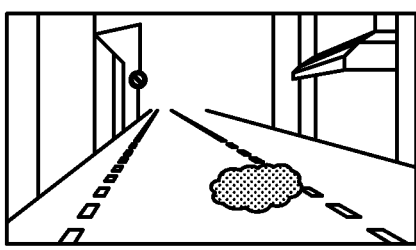
DISTRIBUTION DATA C
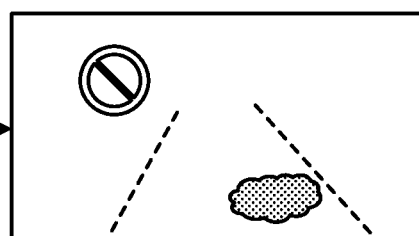
IMAGE D
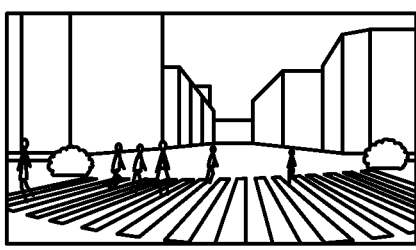
DISTRIBUTION DATA D
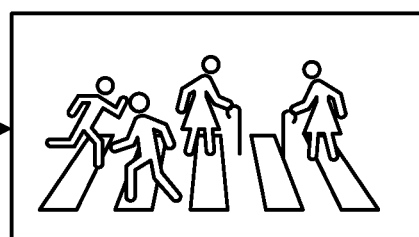

FIG.7
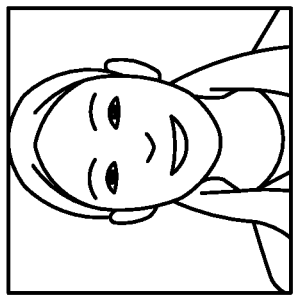 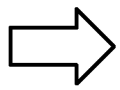 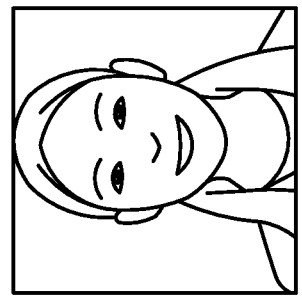
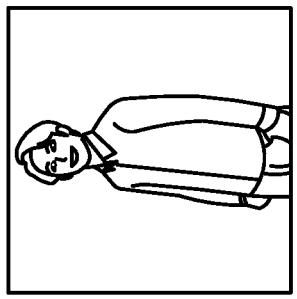 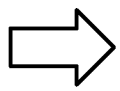 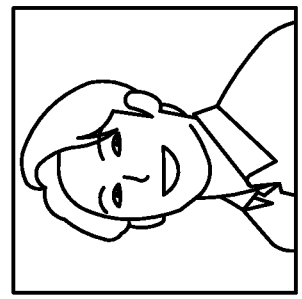
 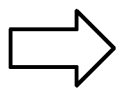 
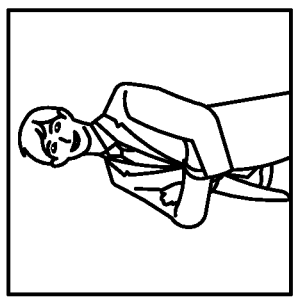 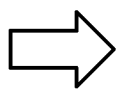 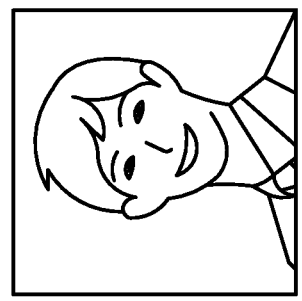
IMAGE
IMAGE AFTER PREPROCESSING

DATA DISTRIBUTION SYSTEM, SENSOR DEVICE, AND SERVER

FIELD

The present disclosure relates to a data distribution system, a sensor device, and a server.

BACKGROUND

In recent years, security cameras have been installed everywhere in towns, and vehicles running have also been equipped with in-vehicle cameras capable of capturing images of surrounding environments, whereby captured images in various places can be easily acquired.

SUMMARY

Technical Problem

Unfortunately, images (sensing data) acquired by these cameras are assumed to be used privately by users who have installed the cameras (sensor devices) and are not readily available to other users in terms of security protection and due to lack of commonality in interfaces.

The present disclosure then proposes a data distribution system, a sensor device, and a server for constructing a framework that enables various users to readily use information obtained from sensing data acquired by various sensor devices.

Solution to Problem

According to the present disclosure, a data distribution system includes: one or more sensor devices configured to acquire sensing data; and a server configured to accept a distribution request from one or more requestors requesting distribution of predetermined data capable of being generated from the sensing data. The sensor device includes a sensor unit configured to acquire the sensing data, a model acquirer configured to acquire, from the server, a recognition model corresponding to the distribution request, a recognizer configured to recognize whether the acquired sensing data is applicable to the distribution request, based on the recognition model, a data generator configured to, when the sensing data is applicable to the distribution request, perform a process in accordance with the distribution request for the sensing data and generate the predetermined data, and a sensor device side distributor configured to distribute the predetermined data. The server includes a request acceptor configured to accept the distribution request from the one or more requestors, a model generator configured to generate the recognition model corresponding to the distribution request, and a model transmitter configured to transmit the generated recognition model to the sensor device.

Also, according to the present disclosure, a sensor device includes: a sensor unit configured to acquire sensing data; a model acquirer configured to acquire a recognition model corresponding to a distribution request, from a server accepting the distribution request from one or more requestors requesting distribution of predetermined data capable of being generated from the sensing data; a recognizer configured to recognize whether the acquired sensing data is applicable to the distribution request, based on the recognition model; a data generator configured to, when the sensing data is applicable to the distribution request, perform a process in accordance with the distribution request for the sensing data and generate the predetermined data; and a sensor device side distributor configured to distribute the predetermined data.

Moreover, according to the present disclosure, a server includes: a request acceptor configured to accept a distribution request from a requestor requesting distribution of predetermined data; a model generator configured to generate a recognition model for recognizing, in a sensor device, whether sensing data acquired by the sensor device is applicable to the distribution request; and a model transmitter configured to transmit the generated recognition model to the sensor device.

BRIEF DESCRIPTION OF DRAWINGS

FIG. 6 is a diagram illustrating an example of distribution data according to the embodiment.

FIG. 7 is a diagram illustrating an example of preprocessing according to the embodiment.

DESCRIPTION OF EMBODIMENTS

Figure 1:
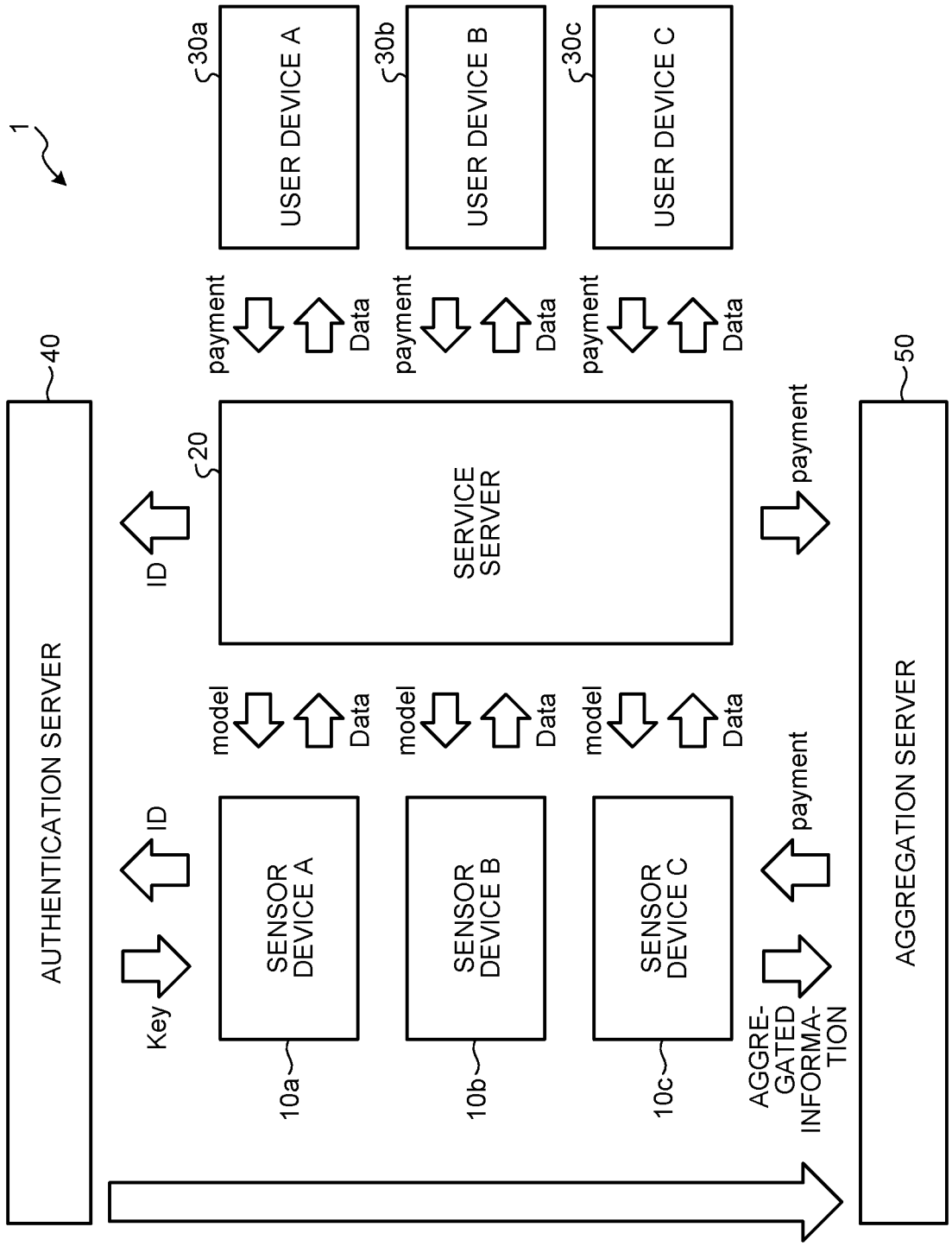
FIG. 1 is a system diagram illustrating an overall functional configuration of a data distribution system 1 according to an embodiment of the present disclosure.

Preferred embodiments of the present disclosure will be described in detail below with reference to the accompanying drawings. In the present description and drawings, the constituent elements having substantially the same functional configuration are denoted by the same reference signs and an overlapping description thereof is omitted. In the present description and drawings, a plurality of constituent elements having substantially the same or similar functional configuration may be denoted by the same reference sign followed by different numerals so that they are distinguished from each other. However, when constituent elements having substantially the same or similar functional configuration need not be distinguished from each other, they are denoted only by the same reference sign. In the present description and drawings, similar constituent elements in different embodiments may be denoted by the same reference sign followed by different alphabetic letters so that they are distinguished from each other. However, when similar constituent elements need not be distinguished from each other, they are denoted only by the same reference sign.

The description is given in the following order.
1. Background Leading to Creation of Present Embodiment
2. Embodiments
    2.1 Overall Configuration of Data Distribution System 1
    2.2 Detailed Configuration of Sensor Device 10
    2.3 Detailed Configuration of Service Server 20
    2.4 Detailed Configuration of Aggregation Server 50
    2.5 Recognition According to Present Embodiment
    2.6 Information Processing Method
    2.7 Modifications
3. Examples
4. Sum-up
5. Hardware Configuration
6. Application to Movable Body
7. Supplemental Remarks

1. BACKGROUND LEADING TO CREATION OF PRESENT EMBODIMENT

First of all, prior to description of embodiments of the present disclosure created by the inventor of the present invention, the background that leads to creation of embodiments of the present disclosure by the inventor will be described.

As previously mentioned, in recent years, security cameras have been installed everywhere in towns, and vehicles running have also been equipped with in-vehicle cameras capable of capturing images of surrounding environments, whereby captured images in various places can be easily acquired.

Unfortunately, images acquired by these cameras are assumed to be used privately by users who have installed the cameras and are not readily available to other users in terms of security protection and due to lack of commonality in interfaces. Even if images acquired by these cameras contain information valuable to other users, the users who have installed the cameras are unaware of such other users' needs and do not think about taking advantage of images of the cameras. Thus, the images that are finite resources are far from being effectively used.

The inventor of the present invention has contemplated constructing a framework that enables various users to readily use images acquired by these cameras. In recent years, with the advance of communication technology such as the fifth generation mobile network, large-volume data can be transmitted at high speed to facilitate networking of these cameras, a management server, and user terminals used by users.

The inventor of the present invention has believed that in order to construct the framework described above and take advantage of the framework, the framework need to satisfy the following conditions. The first condition is to provide cameras of different specifications and user terminals of different specifications with an interface common to the framework so that images acquired by these cameras can be used on the user device side. The second condition is to construct a secure environment that protects privacy, since images are likely to contain information related to each individual privacy. The third condition is to transfer information obtained from images acquired from cameras to users in real time. The fourth condition is to reduce load of data transfer and perform data processing and the like in a distributed manner to reduce process load on each device.

In order to satisfy the third and fourth conditions above, the above-noted framework uses artificial intelligence (AI). AI can be implemented even in small computing devices, for example, because of higher performance of computing devices themselves and distributed processing by a plurality of computing devices, and can be used even in cameras located at the ends of a network. Hereinafter, a camera equipped with such an AI function is referred to as AI camera. Specifically, in the above-noted framework, the AI camera instantaneously recognizes whether an image acquired by itself contains information requested by a user and, only when it contains, transfers information obtained from an image to the applicable user. With the AI camera, therefore, information obtained from images can be transferred to users in real time, and in addition, the load of data transfer can be reduced compared with when images are transferred irrespective of whether information requested by users is contained.

That is, in the embodiments according to the present disclosure proposed below, an AI camera having the AI function is used for constructing the framework. Furthermore, in the present embodiment, in order to improve and accelerate recognition in an AI camera, a recognition model used in recognition is dynamically changed in accordance with the ability of the AI camera. In addition, in the present embodiment, the recognition can be improved in accuracy and accelerated by performing recognition after performing preprocessing such that an image acquired by the AI camera has a form in accordance with the recognition model, or by distributing a recognition process.

In the present embodiment, the interface involved in data transfer and the like is commonized so that cameras of different specifications and user terminals of different specifications can be used in the above-noted framework. In the present embodiment, a process that protects privacy is performed on the camera side for an image or information obtained from an image, whereby protection of individual privacy can be ensured in the framework. In the present embodiment, an authentication server is incorporated into the framework to perform authentication for a camera, a management server, and a user terminal in the framework and ensure security in the framework.

As described above, the present disclosure described below proposes embodiments for constructing a framework that enables various users to readily use information obtained from images acquired by various cameras.

In the present embodiment, a mechanism that allows a user to pay a fee based on the provided information to the administrator of a camera providing images can also be incorporated into the framework. In this way, in the present embodiment, even the provider of images can obtain a consideration based on the amount of information and the value of information used, thereby increasing the motivation of the administrator of a camera to provide images for the framework.

The detail of embodiments according to the present disclosure will be described in order below.

2. EMBODIMENTS

<2.1 Overall Configuration of Data Distribution System 1>

First of all, referring to FIG. 1, a configuration example of a data distribution system 1 according to an embodiment of the present disclosure will be described. FIG. 1 is a system diagram illustrating an overall functional configuration of the data distribution system 1 according to an embodiment of the present disclosure.

Specifically, as illustrated in FIG. 1, the data distribution system 1 according to the present embodiment can mainly include a plurality of sensor devices 10a, 10b, and 10c, a service server 20, a plurality of user devices 30a, 30b, and 30c, an authentication server 40, and an aggregation server 50. These devices are connected to a network (not illustrated), for example, through not-illustrated base stations (for example, base stations for mobile phones and access points of a wireless local area network (LAN)) to construct the data distribution system 1. The communication scheme used in the above-noted network may be any schemes either wired or wireless (for example, the fifth generation communication system, Wi-Fi (registered trademark), Bluetooth (registered trademark)), but it is preferable to use a communication scheme capable of stably transmitting large-volume data at high speed. Although the data distribution system 1 includes three sensor devices 10 and three user devices (requestor) 30 in FIG. 1, the data distribution system 1 according to the present embodiment may include three or more. That is, the data distribution system 1 according to the present embodiment can manage a plurality of sensor devices 10, accept a request from a plurality of user devices 30, and can transmit data to them. The overview of the devices included in the data distribution system 1 according to the present embodiment will be described below.

(Sensor Device 10)

The sensor device 10 can acquire sensing data (for example, image, sound, etc.) of the surrounding environment where it is installed and can transmit distribution data (predetermined data) acquired from the acquired sensing data to an external device such as the user device 30 described later. As previously explained, the sensor device 10 is preferably equipped with the AI function to recognize whether the acquired sensing data is applicable to a request (distribution request) from a user, based on a recognition model transmitted from the service server 20 described later.

For example, the sensor device 10 can be an imaging device (camera) installed in a movable body such as an automobile, an imaging device installed in a smartphone carried by a user, or an imaging device such as a security camera installed at home or in a store. In this case, the sensing data is an image. In this case, these imaging devices can acquire an image by collecting light from a subject located in the surrounding where they are installed, forming an optical image on an imaging plane, and converting the optical image formed on the imaging plane into an electrical image signal. In the following description, the movable body can be an automobile, an electric car, a hybrid electric car, a motorcycle, a bicycle, a personal mobility device, an airplane, a drone, a ship or vessel, a robot (movable robot), a construction machine, an agricultural machine (tractor), and the like, unless otherwise specified.

In the present embodiment, the sensor device 10 is not limited to the imaging devices as described above. In the present embodiment, for example, the sensor device 10 may be a depth sensor for measuring the distance (depth) to a subject, a sound collecting device such as a microphone for collecting sound in the surrounding environment, a temperature sensor and a humidity sensor for measuring the temperature and the humidity of the surrounding environment, or a water level sensor for measuring the water level of a river and the like.

In the present embodiment, the sensor device 10 may be any device that has an interface (data transfer format, data transfer method, etc.) common to the data distribution system 1, and its internal configuration is basically not limited. The data distribution system 1 according to the present embodiment therefore can include various sensor devices 10 of different specifications. The detailed configuration of the sensor device 10 will be described later.

(Service Server 20)

The service server 20 is a computer that accepts, from the user device 30 described later, a distribution request for requesting distribution of distribution data that may be generated from the sensing data. The service server 20 can integrate a plurality of distribution requests (requests), generate a recognition model in accordance with the distribution requests, and transmit the generated recognition model to the sensor devices 10 described above. The recognition model is used for recognition in the sensor device 10, which will be detailed later. The service server 20 can also receive distribution data from the sensor device 10, if necessary, and transmit the received distribution data to the user device 30 applicable to the distribution request. For example, the service server 20 can be implemented by hardware such as a central processing unit (CPU), a read-only memory (ROM), and a random-access memory (RAM). The detailed configuration of the service server 20 will be described later.

(User Device 30)

The user device 30 is a terminal carried by a user or installed near the user to accept information input from the user, transmit the accepted information as a distribution request to the service server 20, or receive distribution data involved with the distribution request. For example, the user device 30 can be a mobile terminal such as a tablet personal computer (PC), a smartphone, a mobile phone, a laptop PC, and a notebook PC, or a wearable device such as a head-mounted display (HMD). More specifically, the user device 30 may have a display (not illustrated) presenting display to the user, an operation unit (not illustrated) accepting an operation from the user, a speaker (not illustrated) outputting sound to the user, and the like.

In the user device 30, for example, an application (app) common to the data distribution system 1 or an application having specifications common to the service server 20 described above can be installed. The user device 30 loaded with the application as described above can generate and transmit a distribution request having a form common to the data distribution system 1 and receive distribution data.

In the present embodiment, the users are not limited to individuals but may be those as described below. For example, the users can be map makers, store launch planners, road administration offices, and social infrastructure developers. More specifically, by using service provided by the present embodiment, the map makers can create a detailed map without manual effort, and the store launch planners can easily acquire information when considering launching a new store. By using the service, the road administration offices can easily acquire information for making a road repair plan based on estimation of road states, the types of vehicles on roads, and the like. By using the service, the social infrastructure developers can examine preventive measures and applications to telematics insurance by statistics and analysis of driving tendency and accident causes.

The user then transmits a distribution request to the service server 20 through the user device 30. The distribution request includes information that specifies the content of data (data type) that the user requests to distribute. For example, the distribution request can include an object as a distribution request target (for example, face, person, animal, movable body, text, road (sidewalk, crosswalk, road width, sign, etc.), logo, barcode) and information (data type) that specifies what information (for example, quantity, speed, position, state, age, gender, identified name, estimation result) related to the object is to be requested. The distribution request also can include data format information that specifies a data format (for example, image, text, etc.) of distribution data. The distribution request can further include identification information (ID) of the user or the user device 30. In the present embodiment, the distribution request may include a variety of data used when the service server 20 generates a recognition model (the detail will be described later).

In the present embodiment, the distribution request has a data form common to the data distribution system 1. For example, in the present embodiment, the distribution request can include a character string or a numeral string corresponding to the object information or the data format information. In this case, for the object information or the data format information frequently requested by the users, the corresponding character string or numeral string is determined in advance and stored as a database (not illustrated) in the storage unit (not illustrated) of the service server 20. The service server 20 then can refer to the database to recognize the object information and the data format information corresponding to the character string or the like included in the distribution request. If the character string or the like corresponding to the object information and the data format information desired by the user does not exist in the database, these object information and data format information may be directly described in the distribution request. Alternatively, in this case, a character string or the like corresponding to object information and data format information desired by the user may be newly determined, and the determined character string or the like may be directly described in the distribution request and the database.

(Authentication Server 40)

The authentication server 40 is a computer that receives respective authentication information (ID) of the sensor devices 10 and the service server 20 and determines whether these devices have the authority to provide or to be provided with the service by the data distribution system 1 according to the present embodiment. The authentication server 40 transmits, to a device having the authority, a key to enable access to the service and a command to provide or to be provided with the service. It is assumed that the authentication information has a data form common to the data distribution system 1. That is, the authentication server 40 is used as an authentication application programming interface (API) and can authenticate the sensor device 10 and the service server 20 to associate them with each other. The data distribution system 1 according to the present embodiment can include such an authentication server 40 to ensure security of the data distribution system 1 and can associate the sensor devices 10 with the user devices 30 through the service server 20. The authentication server 40 can be implemented, for example, by hardware such as a CPU, a ROM, and a RAM and can cooperate with the aggregation server 50 described later. In the present embodiment, the authentication server 40 may perform authentication for the user devices 30.

(Aggregation Server 50)

The aggregation server 50 is a computer that cooperates with the authentication server 40 described above to aggregate the distribution amount of distribution data for each user or user device 30 and for each sensor device 10 and determine a data use fee based on the aggregation. The aggregation server 50 then can exchange the data use fee between the administrator of the sensor device 10 and the user through the service server 20. For example, the aggregation server 50 can be implemented, for example, by hardware such as a CPU, a ROM, and a RAM. The detail of the aggregation server 50 will be described later.

In the data distribution system 1 according to the present embodiment, the sensor device 10 and the service server 20 each need not be implemented by a single device and may be implemented by a plurality of devices connected through a variety of wired or wireless networks (not illustrated) to cooperate with each other. In the present embodiment, two or all of the service server 20, the authentication server 40, and the aggregation server 50 may be implemented by an integrated device. The data distribution system 1 according to the present embodiment may include another not-illustrated server.

<2.2 Detailed Configuration of Sensor Device 10>

Figure 2:
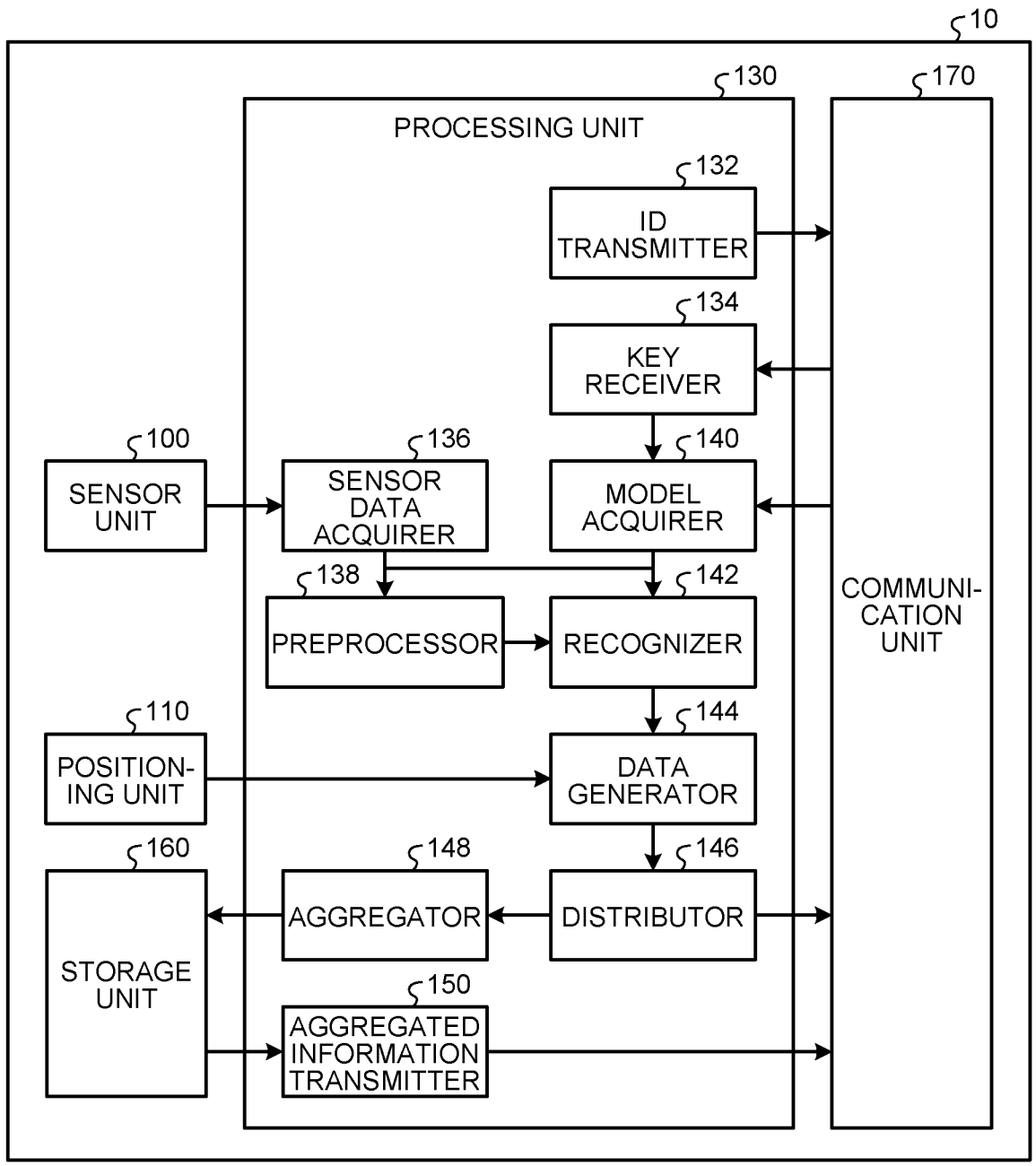
FIG. 2 is a block diagram illustrating a functional configuration example of a sensor device 10 according to the embodiment.

Referring to FIG. 2, a detailed configuration of the sensor device 10 according to the present embodiment will now be described. FIG. 2 is a block diagram illustrating a functional configuration example of the sensor device 10 according to the present embodiment. Specifically, as illustrated in FIG. 2, the sensor device 10 mainly includes a sensor unit 100, a positioning unit 110, a processing unit 130, a storage unit 160, and a communication unit 170. The functional blocks of the sensor device 10 will be described in order below.

(Sensor Unit 100)

The sensor unit 100 acquires sensing data and outputs the acquired sensing data to the processing unit 130 described later. Specifically, when the sensor device 10 is an imaging device, the sensor unit 100 has an imaging optical system such as an imaging lens and a zoom lens for collecting light emitted from a subject and an image sensor such as a charge-coupled device (CCD) or a complementary metal-oxide semiconductor (CMOS). In the present embodiment, the sensor unit 100 may be provided in a fixed manner in the sensor device 10 or may be provided removably from the sensor device 10.

In the present embodiment, the sensor unit 100 may include a time-of-flight (TOF) sensor (not illustrated) as a depth sensor, in addition to the imaging device. The TOF sensor can measure the return time of reflected light from a subject directly or indirectly to acquire the distance between the TOF sensor and the subject and shape information (depth information/image) such as protrusions and depressions. In the present embodiment, the sensor unit 100 may further include a sound collecting device (microphone), a temperature sensor, an atmospheric pressure sensor, a humidity sensor, a wind direction and wind speed sensor, a sunlight sensor, a precipitation sensor, and a water level sensor and may include any sensor that can acquire sensing data from the surrounding environment.

(Positioning Unit 110)

The positioning unit 110 acquires positioning data of the sensor device 10 at a time when sensing data applicable to a distribution request is acquired, and outputs the acquired positioning data to the processing unit 130 (specifically, a data generator 144). For example, the positioning data is transmitted together with distribution data by a distributor 146 of the processing unit 130 described later to the user device 30. The positioning unit 110 can be, specifically, for example, a global navigation satellite system (GNSS) receiver. In this case, the positioning unit 110 can generate positioning data indicating the latitude and the longitude of the present location of the sensor device 10, based on signals from GNSS satellites. In the present embodiment, since the relative position relation of the user can be detected, for example, from information from radio frequency identification (RFID), an access point of Wi-Fi, or a radio base station, such a communication device may be used as the positioning unit 110. In the present embodiment, the positioning unit 110 is not necessarily provided in the sensor device 10.

(Processing Unit 130)

The processing unit 130 has the function of processing sensing data acquired by the sensor unit 100 and generating distribution data. The processing unit 130 aggregates the distribution amount of the distributed distribution data and transmits information based on the aggregation to the aggregation server 50. The processing unit 130 is implemented, for example, by a processing circuit such as a CPU and a graphics processing unit (GPU), a ROM, and a RAM. Specifically, as illustrated in FIG. 2, the processing unit 130 mainly includes an ID transmitter 132, a key receiver 134, a sensor data acquirer 136, a preprocessor 138, a model acquirer 140, a recognizer 142, the data generator 144, the distributor 146, an aggregator 148, and an aggregated information transmitter 150. The detail of the functional modules of the processing unit 130 will be described below.

ID Transmitter 132

The ID transmitter 132 transmits authentication information (ID) of the sensor device 10 to the authentication server 40 through the communication unit 170 described later. The authentication information is used when the authentication server 40 determines whether the sensor device 10 has the authority to provide the service by the data distribution system 1 according to the present embodiment. The data distribution system 1 according to the present embodiment ensures security of the data distribution system 1 through such authentication.

Key Receiver 134

The key receiver 134 receives a key to enable access to service, transmitted by the authentication server 40, and a command to provide service through the communication unit 170 described later and outputs the received key and the like to the model acquirer 140 described later. The model acquirer 140 can use the key and the like received by the key receiver 134 to acquire a recognition model from the service server 20.

Sensor Data Acquirer 136

The sensor data acquirer 136 controls the sensor unit 100 to acquire sensing data output from the sensor unit 100 and outputs the acquired sensing data to the preprocessor 138 or the recognizer 142 described later.

Preprocessor 138

The preprocessor 138 preprocesses sensing data output from the sensor data acquirer 136, in accordance with information (for example, information related to training data used to generate the recognition model) included in the recognition model acquired by the model acquirer 140 described later, and outputs the preprocessed sensing data to the recognizer 142 described later. Specifically, the recognizer 142 uses a recognition model corresponding to a distribution request that is obtained by machine learning to recognize whether sensing data is applicable to the distribution request. Then, in the present embodiment, preprocessing is performed such that sensing data has a form close to the recognition model, thereby providing the recognizer 142 with sensing data suitable for the recognition. As a result, the present embodiment can improve the accuracy in recognition by the recognizer 142. The detail of the preprocessing in the preprocessor 138 will be described later.

Model Acquirer 140

The model acquirer 140 acquires a recognition model corresponding to a distribution request from the service server 20 through the communication unit 170 described later and outputs the acquired recognition model to the preprocessor 138 and the recognizer 142. The detail of the recognition model will be described later.

Recognizer 142

The recognizer 142 can use the AI function, for example, to recognize whether sensing data output from the sensor data acquirer 136 or sensing data preprocessed by the preprocessor 138 is applicable to a distribution request, based on the recognition model output from the model acquirer 140. More specifically, the recognizer 142 can recognize, for example, whether an image as sensing data includes an image of an object specified by the distribution request (in other words, recognition of an object). The recognizer 142 then outputs the recognition result to the data generator 144 described later. The recognition model is obtained by machine learning in the service server 20 and, for example, can be feature information that is obtained from data such as an image or sound of an object specified by the distribution request and characterizes the object. In the present embodiment, since the recognition as described above is performed in the sensor device 10, recognition can be performed immediately after acquisition of sensing data. The detail of the recognition in the recognizer 142 will be described later.

Data Generator 144

When the recognizer 142 described above recognizes that sensing data is applicable to a distribution request, the data generator 144 can perform a process for the sensing data in accordance with the distribution request and generate distribution data. For example, the data generator 144 can generate distribution data by extracting, abstracting, or converting to text only the data related to the object specified by the distribution request from the sensing data. More specifically, the distribution data can include at least one of attribute information, quantity information, position information, state information, operation information, surrounding environment information, and prediction information of the object specified by the distribution request. In the present embodiment, the data format of distribution data can be image data, sound data, text data, and the like. However, the present invention is not limited thereto. In this way, in the present embodiment, since the sensor device 10 can preprocess sensing data applicable to the distribution request and generate distribution data, real-time distribution can be implemented. In the present embodiment, when sensing data is not applicable to the distribution request, the data generator 144 does not generate or distribute distribution data. The present embodiment therefore can reduce load of data transmission, compared with when sensing data is transmitted irrespective of whether sensing data is applicable to the distribution request.

In the present embodiment, for example, the data generator 144 can eliminate, from the distribution data, information related to privacy (for example, a captured image of a person to such a degree that the person can be identified) included in the sensing data. For example, the data generator 144 can mask information related to privacy on the distribution data. In this way, the present embodiment ensures protection of privacy. Examples of such a process will be described later.

Distributor 146

The distributor 146 distributes the distribution data generated by the data generator 144 described above to the user device 30 or the service server 20. The distributor 146 may distribute different kinds of distribution data to the user device 30 or the service server 20. The distributor 146 outputs information such as the distribution amount of the distributed distribution data to the aggregator 148 described later. For example, the distributor 146 outputs, as the above-noted information, information on the date and time when sensing data corresponding to distribution data is acquired, information on the date and time when distribution data is distributed, data type, data format, the distribution amount, and the distribution destination (for example, recognition information of the user device 30).

Aggregator 148

The aggregator 148, for example, generates aggregated information in which the distribution amount of distribution data is aggregated, for each user or user device 30, and outputs the generated aggregated information to the storage unit 160 described later.

Aggregated Information Transmitter 150

The aggregated information transmitter 150 acquires aggregated information from the storage unit 160 described later at a predetermined timing (for example, every month) and transmits the acquired aggregated information to the aggregation server 50. The aggregated information transmitter 150 transmits, as aggregated information, for example, information on the date and time when sensing data corresponding to distribution data is acquired, information on the date and time when distribution data is distributed, data type, data format, the distribution amount, and the distribution destination (for example, recognition information of the user device 30), identification information of the sensor device 10, and information on the administrator of the sensor device 10.

(Storage Unit 160)

The storage unit 160 stores a computer program and information for the processing unit 130 to perform a variety of processes, and information obtained through a process. For example, the storage unit 160 stores the aggregated information generated by the aggregator 148 described above. The storage unit 160 is implemented, for example, by a storage device such as a hard disk drive (HDD).

(Communication Unit 170)

The communication unit 170 can transmit/receive information to/from an external device such as the service server 20. In other words, the communication unit 170 is a communication interface having the function of transmitting and receiving data. The communication unit 170 is implemented by a communication device (not illustrated) such as a communication antenna, a transmitter/receiver circuit, and a port.

<2.3 Detailed Configuration of Service Server 20>

Figure 3:
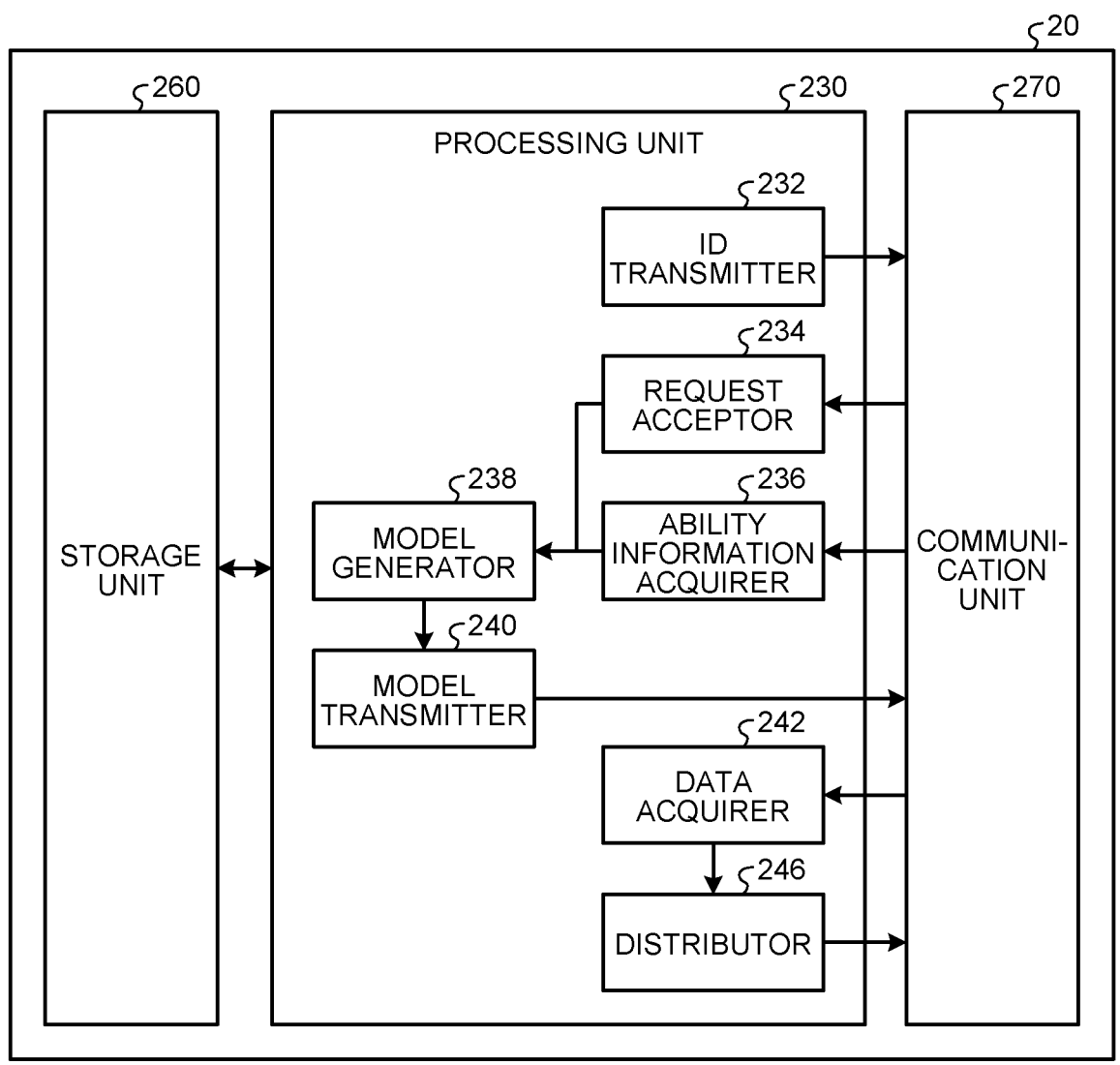
FIG. 3 is a block diagram illustrating a functional configuration example of a service server 20 according to the embodiment.

Referring to FIG. 3, a detailed configuration of the service server 20 according to the present embodiment will now be described. FIG. 3 is a block diagram illustrating a functional configuration example of the service server 20 according to the present embodiment. Specifically, as illustrated in FIG. 3, the service server 20 mainly includes a processing unit 230, a storage unit 260, and a communication unit 270. The functional blocks of the service server 20 will be described in order below.

(Processing Unit 230)

The processing unit 230 has the function of acquiring a distribution request from the user device 30 through the communication unit 270 described later, generating a recognition model in accordance with the acquired distribution request, and transmitting the generated recognition model to the sensor device 10. The processing unit 230 is implemented, for example, by a processing circuit such as a CPU and a GPU, a ROM, and a RAM. Specifically, as illustrated in FIG. 3, the processing unit 230 mainly includes an ID transmitter 232, a request acceptor 234, an ability information acquirer 236, a model generator 238, a model transmitter 240, a data acquirer 242, and a distributor 246. The detail of the functional modules of the processing unit 230 will be described below.

ID Transmitter 232

The ID transmitter 232 transmits authentication information (ID) of the service server 20 to the authentication server 40 through the communication unit 270 described later. The authentication information is used when the authentication server 40 determines whether the service server 20 has the authority to be provided with the service by the data distribution system 1 according to the present embodiment. The data distribution system 1 according to the present embodiment ensures security of the data distribution system 1 through such authentication.

Request Acceptor 234

The request acceptor 234 accepts a distribution request from one or more user devices 30 through the communication unit 270 described later and outputs the accepted distribution request to the model generator 238 described later. The request acceptor 234 may integrate common distribution requests and output the integrated distribution request.

Ability Information Acquirer 236

The ability information acquirer 236 preliminarily acquires ability information indicating the sensing ability (the type, accuracy, position, range, granularity, etc. of sensing) and the computing ability of each sensor device 10 through the communication unit 270 and outputs the acquired ability information to the model generator 238 described later. In the present embodiment, it is preferable that the ability information acquirer 236 reacquires the ability information when the function and the like of the sensor device 10 is updated. Then, in the present embodiment, the model generator 238 described later generates a recognition model in accordance with the ability of each sensor device 10, based on the ability information of the sensor device 10. According to the present embodiment, therefore, since the ability information is reacquired when the function and the like of the sensor device 10 is updated, the recognition model can be updated to match the ability of each sensor device 10 at present.

Model Generator 238

The model generator 238 can generate a recognition model corresponding to a distribution request, through machine learning, in accordance with the ability of each sensor device 10, based on a distribution request from the request acceptor 234 and ability information from the ability information acquirer 236. The model generator 238 can output the generated recognition model to the model transmitter 240 described later. The model generator 238 may acquire data necessary for machine learning from the user device 30 or not-illustrated another server. In the present embodiment, recognition in the sensor device 10 can be implemented since the model generator 238 can generate a recognition model suitable for each sensor device 10. In the present embodiment, since the recognition model can be regenerated by reacquiring the ability information when the function and the like of the sensor device 10 is updated, the recognition model can be dynamically changed to improve recognition in the sensor device 10.

The model generator 238 may include information on data used in machine learning in the model generator 238 (for example, information on training data used when the recognition model is generated) in the recognition model. The information is used in the preprocessor 138 of the sensor device 10 to perform preprocessing such that sensing data has a form close to the recognition model. The model generator 238 may further include, in the recognition model, setting information about the settings of the sensor unit 100 of the sensor device 10, for acquiring sensing data required to generate distribution data specified by the distribution request, based on the ability information of the sensor device 10. In the present embodiment, the model generator 238 may be provided as a device separate from the service server 20. However, the present invention is not limited thereto.

Model Transmitter 240

The model transmitter 240 transmits the recognition model acquired from the model generator 238 described above to the sensor device 10 corresponding to each recognition model through the communication unit 270.

Data Acquirer 242

The data acquirer 242 acquires distribution data corresponding to a distribution request from the sensor device 10 through the communication unit 270 described later and outputs the acquired distribution data to the distributor 246 described later. In the present embodiment, when distribution data is transmitted directly from the sensor device 10 to the user device 30, the data acquirer 242 need not be provided.

Distributor 246

The distributor 246 distributes the distribution data acquired by the data acquirer 242 described above to the user device 30 applicable to the distribution request through the communication unit 270 described later. In the present embodiment, when distribution data is transmitted directly from the sensor device 10 to the user device 30, the distributor 246 need not be provided.

(Storage Unit 260)

The storage unit 260 stores a computer program and information for the processing unit 230 to perform a variety of processes, and information obtained through a process. The storage unit 260 is implemented, for example, by a storage device such as an HDD.

(Communication Unit 270)

The communication unit 270 can transmit/receive information to/from an external device such as the sensor device 10 and the user device 30. In other words, the communication unit 270 is a communication interface having the function of transmitting and receiving data. The communication unit 270 is implemented by a communication device (not illustrated) such as a communication antenna, a transmitter/receiver circuit, and a port.

<2.4 Detailed Configuration of Aggregation Server 50>

Figure 4:
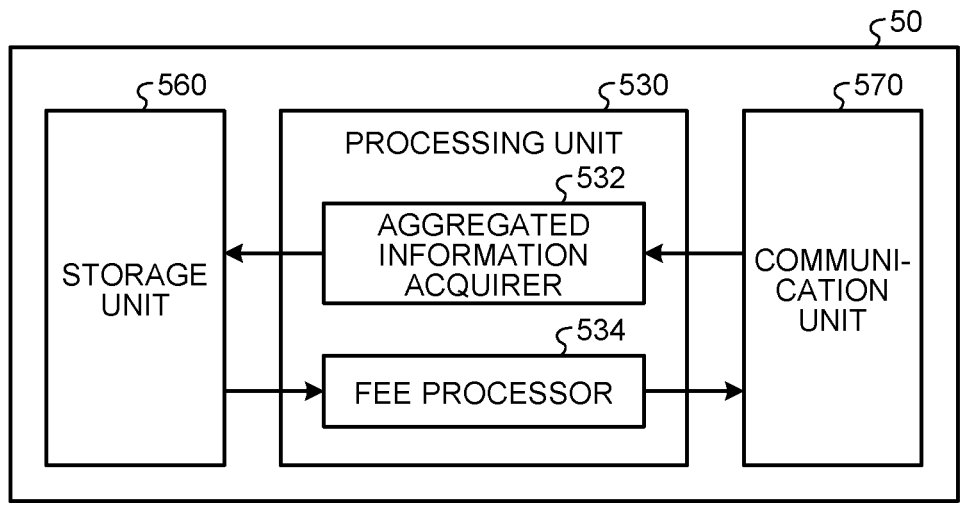
FIG. 4 is a block diagram illustrating a functional configuration example of an aggregation server 50 according to the embodiment.

Referring to FIG. 4, a detailed configuration of the aggregation server 50 according to the present embodiment will now be described. FIG. 4 is a block diagram illustrating a functional configuration example of the aggregation server 50 according to the present embodiment. Specifically, as illustrated in FIG. 4, the aggregation server 50 mainly includes a processing unit 530, a storage unit 560, and a communication unit 570. The functional blocks of the aggregation server 50 will be described in order below.

(Processing Unit 530)

The processing unit 530 has the function of processing the aggregated information and the like transmitted from the sensor device 10 and performing a process such as exchanging of a data use fee based on the aggregated information and the like. The processing unit 530 is implemented, for example, by a processing circuit such as a CPU, a ROM, and a RAM. Specifically, as illustrated in FIG. 4, the processing unit 530 mainly includes an aggregated information acquirer 532 and a fee processor 534. The detail of the functional modules of the processing unit 530 will be described below.

Aggregated Information Acquirer 532

The aggregated information acquirer 532 acquires the aggregated information and the like from each sensor device 10 through the communication unit 570 described later and outputs the acquired aggregated information and the like to the storage unit 560 described later.

Fee Processor 534

The fee processor 534 can determine a data use fee based on the aggregated information and the like stored in the storage unit 560 described later and exchange the data use fee between the aggregation server 50, and the administrator of the sensor device 10 and the service server 20. Specifically, the fee processor 534 determines a data use fee to be charged to the service server 20, based on the distribution amount of distribution data distributed and a fee per unit distribution amount of distribution data (for example, determined by a data format). Similarly, the fee processor 534 determines a data use fee to be paid to each sensor device 10. In the present embodiment, since the administrator of each sensor device 10 can obtain a data use fee, a contribution for the service by the data distribution system 1 according to the present embodiment can be distributed even to the administrator of each sensor device 10. In this way, in the present embodiment, since the provider of sensing data also can obtain a consideration depending on the distribution amount and the value of distribution data, the motivation to provide sensing data for the service by the data distribution system 1 according to the present embodiment can be increased.

(Storage Unit 560)

The storage unit 560 stores a computer program and information for the processing unit 530 to perform a variety of processes, and information obtained through a process. For example, the storage unit 560 stores the aggregated information transmitted from the sensor device 10. The storage unit 560 is implemented, for example, by a storage device such as an HDD.

(Communication Unit 570)

The communication unit 570 can transmit/receive information to/from an external device such as the sensor device 10. In other words, the communication unit 570 is a communication interface having the function of transmitting and receiving data. The communication unit 570 is implemented by a communication device (not illustrated) such as a communication antenna, a transmitter/receiver circuit, and a port.

<2.5 Recognition According to Present Embodiment>

Figure 5:
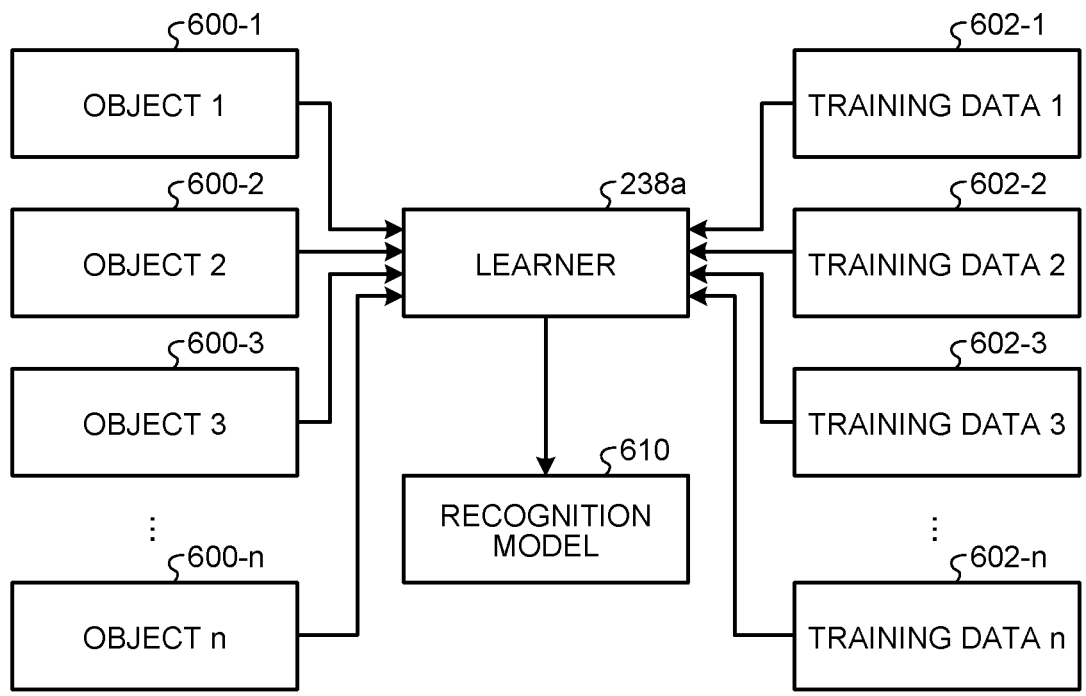
FIG. 5 is a diagram illustrating a generation example of a recognition model 610 according to the embodiment.

Referring to FIG. 5 to FIG. 7, an example of recognition according to the present embodiment will now be described. FIG. 5 is a diagram illustrating a generation example of a recognition model 610 according to the present embodiment. FIG. 6 is a diagram illustrating an example of distribution data according to the present embodiment. FIG. 7 is a diagram illustrating an example of preprocessing according to the present embodiment.

(Generation of Recognition Model)

First, generation of a model used in recognition according to the present embodiment will be described. As previously explained, the recognition model is generated in the model generator 238 of the service server 20. As illustrated in FIG. 5, for example, the model generator 238 has a supervised learner 238a such as a support vector regression and a deep neural network. First, to the learner 238a, for example, a plurality of training data 602-1 to 602-n is input, which is information about an object as a distribution request target specified by a distribution request. The learner 238a can perform machine learning with the input training data 602-1 to 602-n to generate the recognition model 610 for use in recognition in the recognizer 142 of the sensor device 10. In the present embodiment, since a plurality of sensor devices 10 vary in sensing ability and computing ability, that is, have different abilities to recognize, it is preferable that the learner 238a generates the recognition model 610 in accordance with the ability information of each sensor device 10. In the present embodiment, therefore, even when a plurality of sensor devices 10 having various specifications are included, the recognition model 610 can be generated in accordance with the ability of each sensor device 10, thereby enabling recognition in each sensor device 10.

More specifically, the learner 238a, for example, receives training data 602-1 to 602-n about an object, respectively labeled with objects 600-1 to 600-n as a distribution request target specified by the distribution request. The learner 238a then extracts the feature points and the feature amounts of the object from a plurality of training data 602-1 to 602-n, through machine learning by a recurrent neural network or the like. The thus extracted information such as feature points serves as the recognition model 610 for recognizing whether the sensing data acquired by each sensor device 10 includes information on the object.

Generation of the recognition model 610 according to the present embodiment will now be described with specific examples. For example, a case where a distribution request from a user requests a search for a predetermined person (object) using an image (sensing data) acquired by the sensor device 10 (where distribution data is position information of a predetermined person) will be described. The service server 20 acquires a plurality of images of the predetermined person as a plurality of training data 602 for use in generating the recognition model 610, from the user device 30 that has transmitted the distribution request or a not-illustrated server. As illustrated in FIG. 5, the service server 20 then inputs the acquired images (training data) 602-1 to 602-n, labelled with the predetermined person (object) 600-1 to 600-n, to the learner 238a. Furthermore, the learner 238a extracts the feature points and the feature amounts of the predetermined person (object) 600 from a plurality of images (training data) 602-1 to 602-n, through machine learning using a plurality of images (training data) 602-1 to 602-n, and generates the recognition model 610 for recognizing the image of the predetermined person (object) 600 from an image (sensing data).

In the present embodiment, when a distribution request from a user requests a search for a predetermined person (object) using the sensing data (here, the type of the sensing data is not limited) acquired by the sensor device 10 similarly to the example above, the learner 238a may generate the recognition model 610 in accordance with the type of sensing data that can be acquired by each sensor device 10. In this case, more specifically, the learner 238a generates the recognition model 610 for recognizing the predetermined person from an image, for the sensor device 10 capable of acquiring an image, and generates the recognition model 610 for recognizing voice of the predetermined person from environmental sound, for the sensor device 10 capable of acquiring environmental sound. In the present embodiment, therefore, even when a plurality of sensor devices 10 having various specifications are included, the recognition model 610 can be generated in accordance with the ability of each sensor device 10, thereby enabling recognition in each sensor device 10.

In the present embodiment, for example, when a distribution request from a user requests a search for a predetermined cat (here, a cat named "Tama" with the type American Shorthair) using an image acquired by the sensor device 10, the learner 238a may generate the recognition model 610 in accordance with the ability of each sensor device 10. In this case, more specifically, the learner 238a generates the recognition model 610 for recognizing an image of "Tama" from an image, for the sensor device 10 that has a sensing ability capable of acquiring an image having a high resolution and has a high computing ability. The learner 238a generates the recognition model 610 for recognizing an image of American Shorthair (cat type) from an image, for the sensor device 10 that has a sensing ability capable of acquiring an image having an intermediate resolution and has a high computing ability. The learner 238a generates the recognition model 610 for recognizing an image of a cat from an image, for the sensor device 10 that has a sensing ability capable of acquiring an image having a low resolution and has a low computing ability. In the present embodiment, therefore, even when a plurality of sensor devices 10 having various specifications are included, the recognition model 610 can be generated in accordance with the ability of each sensor device 10, thereby enabling recognition in each sensor device 10.

As previously explained, in the present embodiment, the recognition model 610 may include information about training data 602 used in machine learning. Here, the information about training data 602 can be the type of training data 602 (for example, image, sound, etc.) and the quality of training data (distortion compensation level, pixel defect, white balance, image size, chroma, brightness, gamma, contrast, edge enhancement level, focus, exposure level, resolution, dynamic range, noise reduction level, etc.). Such information about training data 602 can be used when the preprocessor 138 of the sensor device 10 described above performs preprocessing such that the acquired sensing data has a form close to the recognition model (specifically, training data 602). In this way, the present embodiment can improve the accuracy in recognition by the recognizer 142 of the sensor device 10, which will be detailed later.

In the present embodiment, as previously explained, the recognition model 610 may include setting information about the settings of the sensor unit 100 of the sensor device 10, for acquiring sensing data required to generate distribution data specified by a distribution request. As used herein, the setting information can be the type of sensing data (for example, image, sound, etc.) and a setting value (distortion compensation level, white balance, image size, chroma, brightness, gamma, contrast, edge enhancement level, focus, exposure level, resolution, dynamic range, noise reduction level, etc.) of the sensor unit 100 in accordance with the desired quality of sensing data. In the present embodiment, such setting information is used for setting the sensor unit 100 and enables acquisition of sensing data in accordance with the recognition model 610, leading to improvement in accuracy in recognition by the recognizer 142.

In the present embodiment, the learner 238a may be provided in a server separate from the service server 20. However, the present invention is not limited thereto. In the present embodiment, the learning method in the learner 238*a* is not limited to the method described above, and any other methods may be used.

(Recognition Using Recognition Model)

Recognition using the recognition model 610 described above will now be described. As previously explained, the recognition model 610 is used when the recognizer 142 of the sensor device 10 recognizes whether sensing data or preprocessed sensing data is applicable to a distribution request. Recognition according to the present embodiment will now be described with specific examples. For example, a case where a distribution request from a user requests a search for a predetermined person (object) using an image (sensing data) acquired by the sensor device 10 (distribution data is position information of a predetermined person) will be described. The sensor device 10 acquires an image from the sensor unit 100. The recognizer 142 then refers to the recognition model 610 acquired from the service server 20, specifically, the feature point and the feature amount of the image of the predetermined person (object) 600 to determine whether an image of the predetermined person is included in the image acquired from the sensor unit 100. That is, in the present embodiment, since the recognition as described above is performed in the sensor device 10, recognition can be performed immediately after acquisition of an image.

In the present embodiment, since a plurality of sensor devices 10 vary in sensing ability and computing ability, that is, have different abilities to recognize, a corresponding recognition model 610 is generated and recognition is performed in accordance with the ability information of each sensor device 10. For example, in the present embodiment, when a distribution request from a user requests a search for a predetermined person (object) using sensing data (here, the type of sensing data is not limited) acquired by the sensor device 10, the recognizer 142 of the sensor device 10 capable of acquiring an image recognizes an image of the predetermined person from an image based on the recognition model 610, and the recognizer 142 of the sensor device 10 capable of acquiring environmental sound recognizes voice of the predetermined person from environmental sound based on the recognition model 610.

In another example, in the present embodiment, when a distribution request from a user requests a search for a predetermined cat (here, a cat named "Tama" with the type American Shorthair) using an image acquired by the sensor device 10, the recognition may be performed as follows. The recognizer 142 of the sensor device 10 that has a sensing ability capable of acquiring an image having a high resolution and has a high computing ability recognizes an image of "Tama" from an image, based on the recognition model 610. The recognizer 142 of the sensor device 10 that has a sensing ability capable of acquiring an image having an intermediate resolution and has a high computing ability recognizes an image of American Shorthair (cat type) from an image, based on the recognition model 610. The recognizer 142 of the sensor device 10 that has a sensing ability capable of acquiring an image having a low resolution and has a low computing ability recognizes an image of a cat from an image, based on the recognition model 610. As described above, in the present embodiment, even when a plurality of sensor devices 10 having various specifications are included, recognition can be performed in each sensor device 10.

In the present embodiment, the recognizer 142 may be provided as a device separate from the sensor device 10. However, the present invention is not limited thereto. In the present embodiment, the recognition method in the recognizer 142 is not limited to the method described above, and any other methods may be used.

(Examples of Distribution Data)

Referring to FIG. 6, an example of distribution data according to the present embodiment will now be described. As previously explained, the data generator 144 of the sensor device 10 performs a process in accordance with the distribution request for sensing data and generates distribution data. The distribution data can include at least one of attribute information, quantity information, position information, state information, operation information, surrounding environment information, and prediction information of an object specified by the distribution request. The distribution data can have a data format such as an image and text. However, the present invention is not limited thereto. It is preferable that the distribution data includes identification information of the user or the user device 30 that has transmitted the distribution request. That is, for example, the data generator 144 can extract, abstract, or converts to text only the data on an object specified by the distribution request from the sensing data, as distribution data, in accordance with the distribution request. In this way, in the present embodiment, the data generator 144 can process sensing data applicable to a distribution request and generate distribution data, thereby implementing real-time distribution. In the present embodiment, when sensing data is not applicable to a distribution request, the data generator 144 does not generate or transmit distribution data. The present embodiment therefore can reduce load of data transmission, compared with when sensing data is transmitted irrespective of whether sensing data is applicable to the distribution request.

In the present embodiment, the data generator 144 can eliminate information related to privacy (for example, a captured image of a person to such a degree that the person can be identified) included in the sensing data, from the distribution data. In this way, the present embodiment ensures protection of privacy. More specifically, in the example illustrated in the top section in FIG. 6, when a road image A is acquired as sensing data applicable to a distribution request, the data generator 144 extracts only a signage and a crosswalk specified by the distribution request to generate distribution data A. In the example illustrated in the second section from the top in FIG. 6, when a road image B is acquired as sensing data applicable to a distribution request, the data generator 144 extracts only a sign and a vehicle on the road specified by the distribution request to generate distribution data B. In the example illustrated in the third section from the top in FIG. 6, when a road image C is acquired as sensing data applicable to a distribution request, the data generator 144 extracts only a signage and a puddle specified by the distribution request to generate distribution data C. In the example illustrated in the bottom section in FIG. 6, when a road image D is acquired as sensing data applicable to a distribution request, the data generator 144 extracts only a crosswalk and persons crossing the crosswalk to generate distribution data D. In the present embodiment, as in the example in the bottom section in FIG. 6, it is preferable that person-shaped icons are arranged instead of person images, rather than extracting images of persons crossing the crosswalk as they are as distribution data. Doing this enables high privacy protection. That is, in the present embodiment, for example, information related to privacy such as a captured image of a person with such a resolution that can identify the person is eliminated from the distribution data.

(Examples of Preprocessing)

Referring to FIG. 7, an example of preprocessing according to the present embodiment will now be described. In the present embodiment, as previously explained, the recognizer 142 can recognize whether sensing data is applicable to the distribution request, using the recognition model 610 obtained by machine learning. Then, in the present embodiment, in order to improve the accuracy in recognition in the recognizer 142, the preprocessor 138 of the sensor device 10 performs preprocessing such that sensing data has a form close to the recognition model 610, based on the information about training data described above. Specifically, the preprocessor 138 performs preprocessing for sensing data such that format, distortion compensation level, pixel defect, white balance, image size, chroma, brightness, gamma, contrast, edge enhancement level, focus, exposure level, resolution, dynamic range, noise reduction level, and the like are equivalent to the training data 602.

Figure 9:
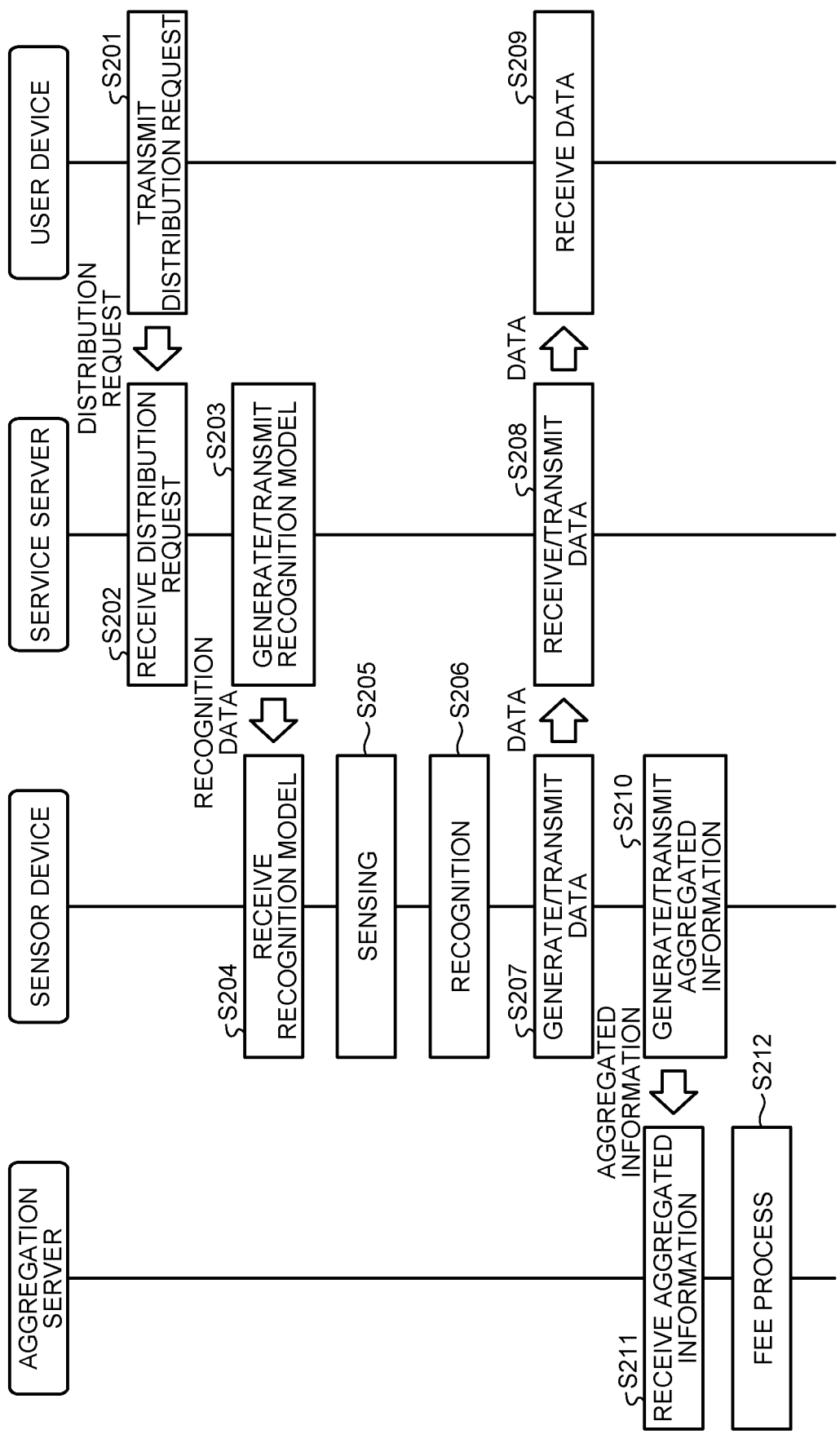
FIG. 9 is a sequence diagram illustrating an example of an information processing method according to a modification to the embodiment.

More specifically, for example, when the sensor unit 100 of the sensor device 10 acquires images as illustrated in the upper section in FIG. 7 as sensing data, the preprocessor 138 performs preprocessing for the images in the upper section in FIG. 9 such that the image quality size and the focus are equivalent to the training data 602. The preprocessor 138 then acquires images as illustrated in the lower section in FIG. 9. According to the present embodiment, since the preprocessor 138 performs preprocessing such that sensing data attains a data level equivalent to that of the training data 602 used when the recognition model 610 is generated, the accuracy in recognition by the recognizer 142 can be further improved.

<2.6 Information Processing Method>

Figure 8:
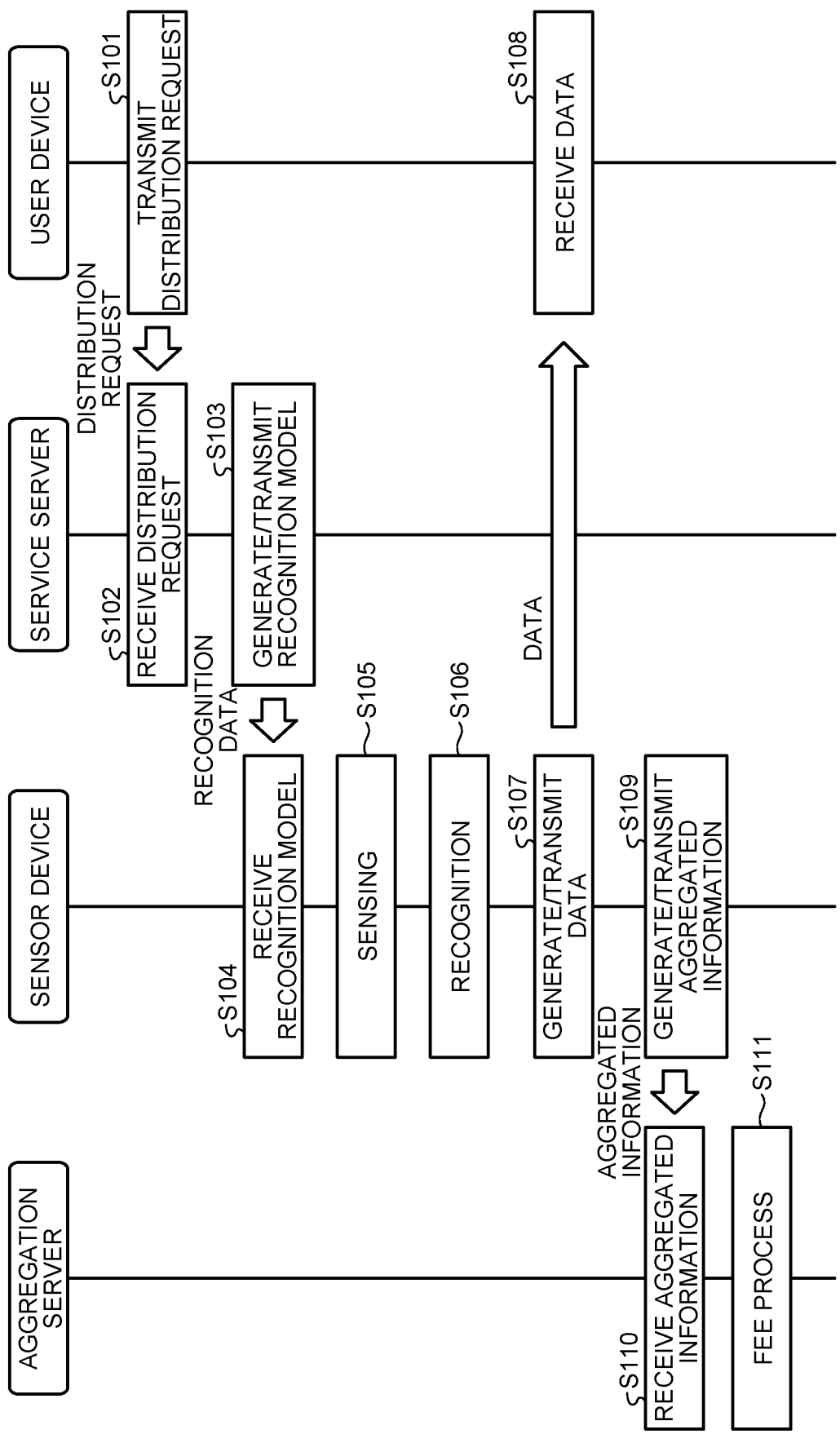
FIG. 8 is a sequence diagram illustrating an example of an information processing method according to the embodiment.

Referring to FIG. 8, an information processing method according to an embodiment of the present embodiment will now be described. FIG. 8 is a sequence diagram illustrating an example of the information processing method according to the present embodiment. As illustrated in FIG. 8, the information processing method according to the present embodiment can mainly include a plurality of steps from step S101 to step S111. The detail of the steps of the information processing method according to the present embodiment will be described below.

First of all, the user device 30 accepts information input from the user and transmits the accepted information as a distribution request to the service server 20 (step S101).

Subsequently, the service server 20 receives the distribution request from the user device 30 (step S102). The service server 20 then generates a recognition model based on the distribution request received at step S102 above and transmits the generated recognition model to each sensor device 10 (step S103).

Subsequently, the sensor device 10 receives the recognition model from the service server 20 (step S104). The sensor device 10 performs sensing to acquire sensing data (step S105). The sensor device 10 recognizes whether the sensing data acquired at step S105 above is applicable to the distribution request, based on the recognition model received at step S104 above (step S106). The sensor device 10 then performs a process in accordance with the distribution request for the sensing data and generates distribution data, based on the recognition that the sensing data is applicable to the distribution request at step S106 above. The sensor device 10 transmits the generated distribution data directly to the user device 30 involved in the distribution request (step S107).

Subsequently, the user device 30 receives the distribution data transmitted from the sensor device 10 (step S108). In the present embodiment, since the distribution data can be transmitted from the sensor device 10 directly to the user device 30, the process load on the service server 20 can be reduced, and increase in running cost for the service server 20 can be avoided.

The sensor device 10 generates aggregated information based on distribution of the distribution data at step S107 above and transmits the generated aggregated information to the aggregation server 50 (step S109).

Subsequently, the aggregation server 50 receives the aggregated information from the sensor device 10 (step S110). The aggregation server 50 performs a fee process, based on the aggregated information received at step S110 above (step S111). The information processing according to the present embodiment then ends.

As described above, the foregoing present embodiment can construct a framework that enables various users to readily use information obtained from sensing data acquired by various sensor devices 10.

<2.7 Modifications>

The detail of the present embodiment has been described so far. The present embodiment can be modified as follows. Modifications according to the present embodiment will be described. The modifications described below are merely illustrative examples of the present embodiment, and the present embodiment is not limited to the modifications described below.

(First Modification)

The information processing method according to the present embodiment can be modified as follows. The information processing method according to a first modification to the present embodiment will be described with reference to FIG. 9. FIG. 9 is a sequence diagram illustrating an example of the information processing method according to a modification to the present embodiment. As illustrated in FIG. 9, the information processing method according to the present modification can mainly include a plurality of steps from step S201 to step S212. The detail of the steps according to the present modification will be described below.

Step S201 to step S206 in the present modification illustrated in FIG. 9 are common to step S101 to step S106 in the present embodiment illustrated in FIG. 8, and a description of step S201 to step S206 is omitted here.

The sensor device 10 transmits the generated distribution data to the service server 20 (step S207). Subsequently, the service server 20 receives the distribution data transmitted from the sensor device 10 and transmits the distribution data to the user device 30 involved in the distribution request (step S208). The user device 30 then receives the distribution data transmitted from the service server 20 (step S209). In the present modification, since distribution data can be transmitted from the sensor device 10 to the user device 30 through the service server 20, the user device 30 can receive the distribution data even when it does not have an interface common to the data distribution system 1, as long as it has an interface common to the service server 20.

Step S210 to step S212 in the present modification illustrated in FIG. 9 are common to step S109 to step S111 in the present embodiment illustrated in FIG. 8, and a description of step S210 to step S212 is omitted here.

(Second Modification)

Figure 10:
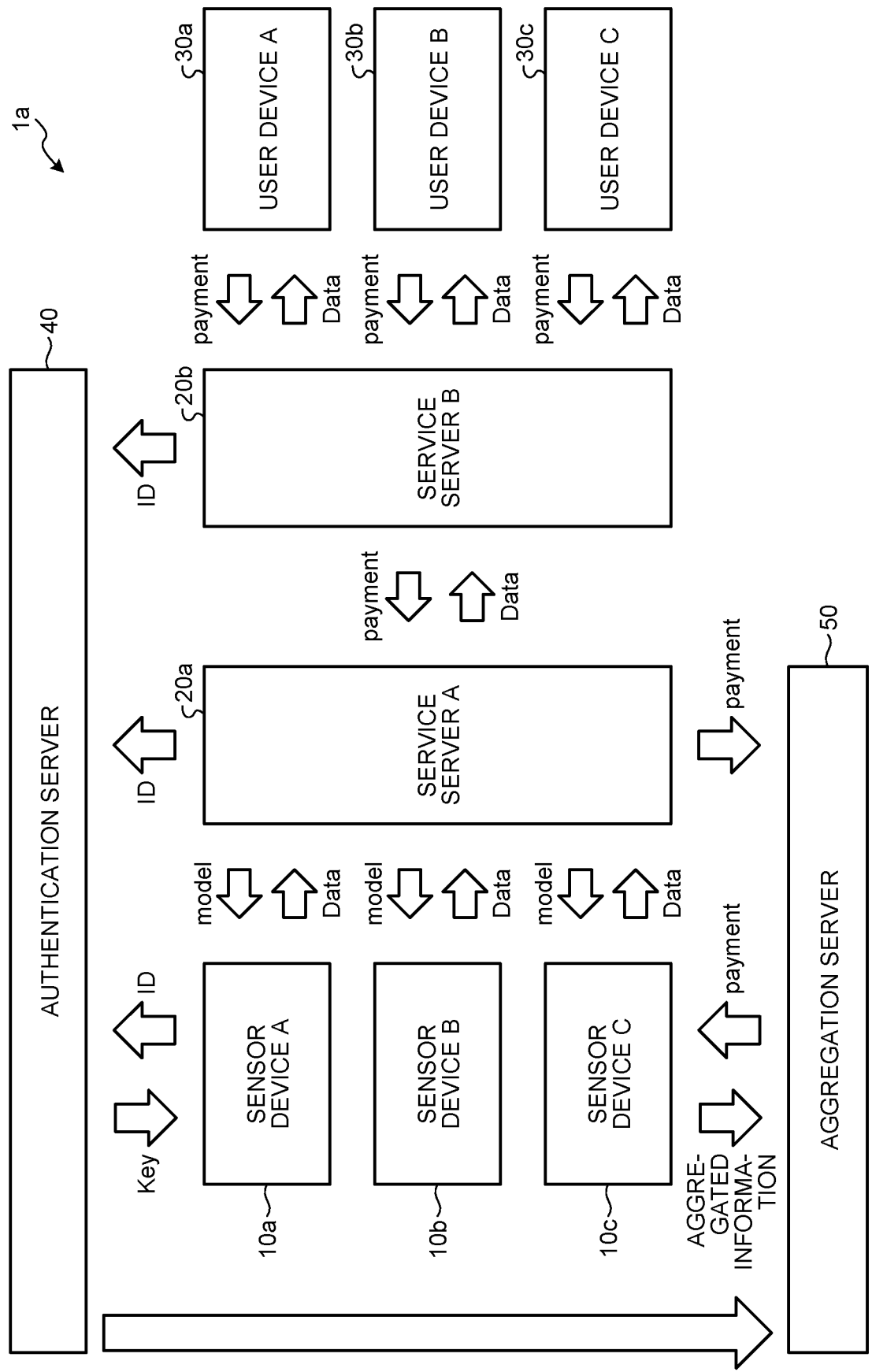
FIG. 10 is a system diagram illustrating an overall functional configuration of a data distribution system 1a according to a modification to the embodiment.

The data distribution system 1 according to the present embodiment can be modified as follows. Referring to FIG. 10, a configuration example of a data distribution system 1a according to a modification to the present embodiment will be described. FIG. 10 is a system diagram illustrating an overall functional configuration of the data distribution system 1a according to a modification to the present embodiment.

Specifically, as illustrated in FIG. 10, the data distribution system 1a according to the present modification can mainly include a plurality of sensor devices 10a, 10b, and 10c, a service server 20a, a plurality of user devices 30a, 30b, and 30c, the authentication server 40, and the aggregation server 50, in the same manner as the foregoing embodiment, and can further include a service server 20b. That is, in the present modification, the data distribution system 1a can include a plurality of service servers 20 if they have an interface (data transfer format, data transfer method, etc.) common to the data distribution system 1a. According to the present modification, therefore, various service providers can join the data distribution system 1a.

(Third Modification)

Figure 11:
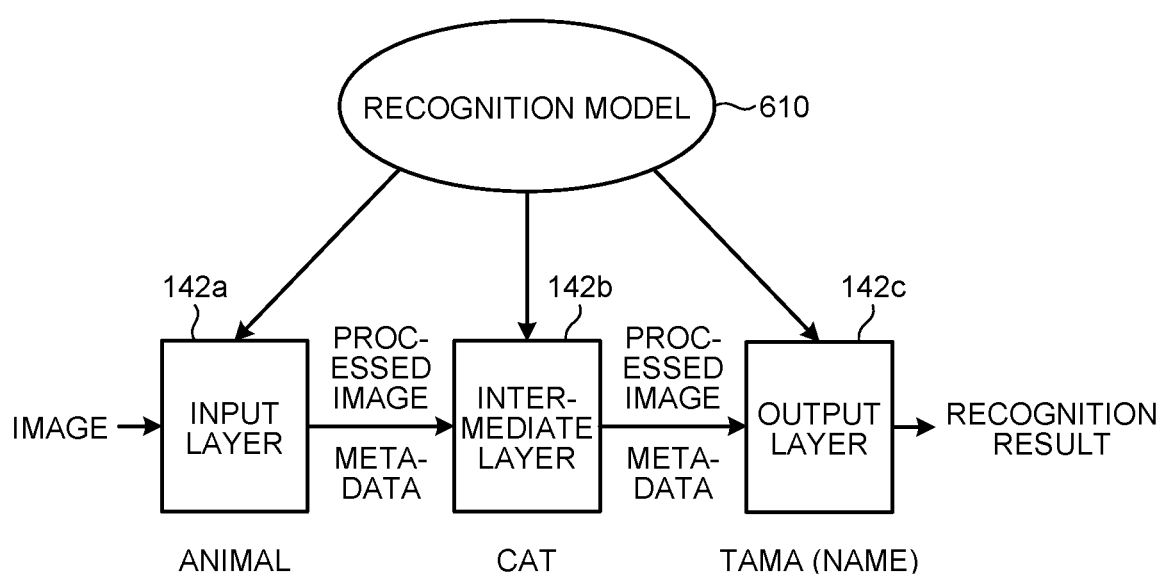
FIG. 11 is a diagram illustrating an example of a recognizer according to a modification to the embodiment.

The recognizer 142 according to the present embodiment can be modified as follows. The recognizer 142 according to a modification to the present embodiment will be described with reference to FIG. 11. FIG. 11 is a diagram illustrating an example of the recognizer 142 according to a modification to the embodiment.

In the present modification, as illustrated in FIG. 11, the recognizer 142 can be configured with a plurality of recognition nodes 142a, 142b, and 142c that are coupled in multiple stages to be able to communicate with each other and cooperate to perform recognition hierarchically. These recognition nodes 142a, 142b, and 142c are computing devices having a common interface and cooperating with each other to recognize whether sensing data is applicable to a distribution request. In the present modification, even when the computing ability of each individual recognition node 142a, 142b, 142c is small, they can perform a recognition process by cooperating to perform the process in a distributed manner even when a recognition process with high load is required.

In the present modification, for example, a plurality of recognition nodes 142a to 142c can be an input layer 142a, an intermediate layer 142b, and an output layer 142c. First, sensing data or preprocessed sensing data is input to the input layer 142a from the sensor data acquirer 136 or the preprocessor 138. The input layer 142a then performs computation based on the feature of the input sensing data and outputs a first recognition result to the intermediate layer 142b. For example, the first recognition result can be sensing data processed to such a level that the input sensing data can be processed by the subsequent intermediate layer 142b, and can be information having an information granularity obtained by computation in the input layer 142a from the sensing data. The information may be output as metadata of the processed sensing data to the intermediate layer 142b.

Subsequently, the intermediate layer 142b receives the first recognition result from the input layer 142a, performs computation based on the feature of the input first recognition result, and outputs a second recognition result to the output layer 142c. For example, similarly to the example above, the second recognition result can be sensing data processed to such a level that the sensing data processed by the input layer 142a can be processed by the subsequent output layer 142c, and can be information having an information granularity obtained by computation in the intermediate layer 142b from the sensing data processed by the input layer 142a. The information may be output as metadata of the processed sensing data to the output layer 142c.

The output layer 142c receives the second recognition result, performs computation based on the feature of the input second recognition result, and outputs a third recognition result to the data generator 144. For example, similarly to the example above, the third recognition result can be information having an information granularity obtained by computation in the output layer 142c from the sensing data processed by the intermediate layer 142b.

In the present modification, the input layer 142a, the intermediate layer 142b, and the output layer 142c can dynamically change the volume of computation to perform, in accordance with each individual ability (computing ability), based on control data included in the recognition model 610 transmitted to each layer from the service server 20. It is preferable that the input layer 142a and the intermediate layer 142b output a recognition result to the subsequent stage in accordance with the processing ability of the subsequent stage (the intermediate layer 142b, the output layer 142c). The control data can be, for example, information such as a connection coefficient between the input layer 142a, the intermediate layer 142b, and the output layer 142c, that is, a weight of the volume of computation, in order to control the volume of computation in the input layer 142a, the intermediate layer 142b, and the output layer 142c. In this way, according to the present modification, the input layer 142a, the intermediate layer 142b, and the output layer 142c coupled in multiple stages can gradually increase the information granularity of the recognition result and thus can provide a final recognition result as desired in a cooperative manner.

For example, in the present modification, when a distribution request from a user requests a search for a predetermined cat (here, a cat named "Tama" with the type American Shorthair) using an image acquired by the sensor device 10, the recognition may be performed as follows. First, the input layer 142a recognizes that the image acquired by the sensor device 10 includes an image of an animal, based on the recognition model 610. The input layer 142a then outputs, to the intermediate layer 142b, a processed image processed to such a level that the image acquired by the sensor device 10 can be processed by the subsequent intermediate layer 142b and a recognition result "animal" as metadata of the processed image. Subsequently, the intermediate layer 142b recognizes that the processed image from the input layer 142a includes an image of a cat, based on the recognition model 610. The intermediate layer 142b then outputs, to the output layer 142c, a processed image processed to such a level that the processed image from the input layer 142a can be processed by the subsequent output layer 142c and a recognition result "cat" as metadata of the processed image. The output layer 142c recognizes that the processed image from the intermediate layer 142b includes an image of "Tama", based on the recognition model 610. The output layer 142c then outputs the recognition result "Tama" to the data generator 144.

In the present modification, the configuration of the recognizer 142 is not limited to the one illustrated in FIG. 11 and may include more stages or may be a complicated network-like configuration such as a neural network. However, the present invention is not limited thereto.

As described above, the foregoing modifications can construct a framework that enables various users to readily use information obtained from sensing data acquired by various sensor devices 10.

3. EXAMPLES

Figure 12:
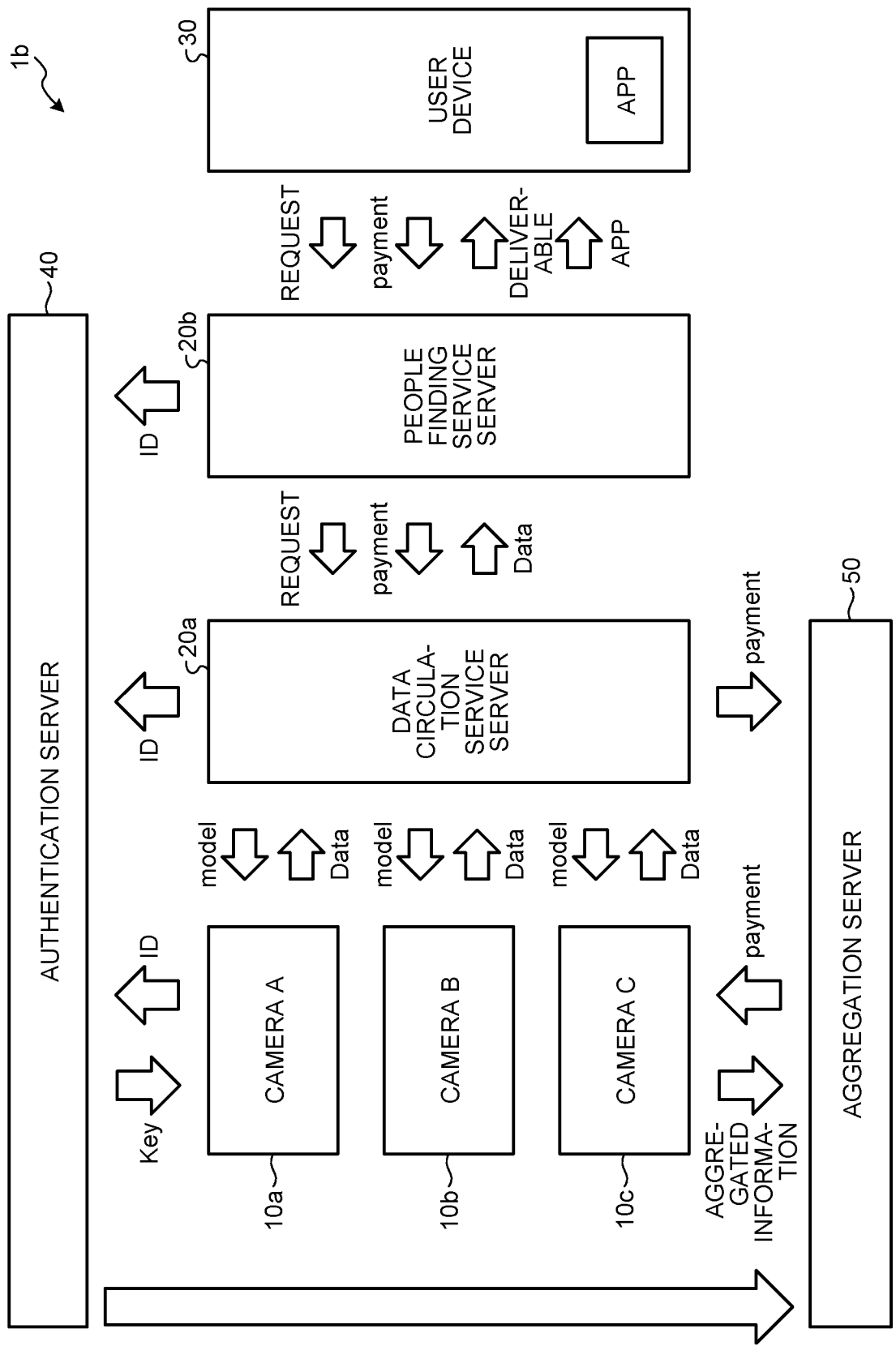
FIG. 12 is a diagram illustrating a usage example of the embodiment.

The detail of the embodiments of the present disclosure has been described so far. Referring to FIG. 12, an example of the information processing method according to the present embodiment will be described more specifically with specific examples. FIG. 12 is a diagram illustrating a usage example of the present embodiment. The examples described below are merely illustrative examples of the information processing method according to the embodiments of the present disclosure, and the information processing method according to the embodiments of the present disclosure is not limited to the examples described below.

In an example described below, it is assumed that a user makes a request to search for a certain person. Specifically, as illustrated in FIG. 12, a data distribution system 1*b* according to the present example includes a plurality of cameras (sensor devices) 10*a*, 10*b*, and 10*c*, a data circulation service server (service server) 20*a*, a people finding service server (service server) 20*b*, the user device 30, the authentication server 40, and the aggregation server 50.

First, the user installs an app provided by the people finding service server 20*b* in the user device 30. The app functions as an interface with the people finding service server 20*b*. The user transmits a request for finding a certain person as a distribution request to the people finding service server 20*b* through the user device 30. In doing so, the user transmits, for example, a plurality of images of the person to find to the people finding service server 20*b*.

Subsequently, the people finding service server 20*b* receives the distribution request from the user device 30 and submits a request (distribution request) to the data circulation service server 20*a* to find the person from images. In doing so, the people finding service server 20*b* may transmit the images of the person obtained from the user to the data circulation service server 20*a* or may entrust itself or an external contractor to generate the recognition model 610 using the images of the person. In this case, the people finding service server 20*b* transmits the recognition model 610 to the data circulation service server 20*a*.

Subsequently, the data circulation service server 20*a* receives the distribution request from the people finding service server 20*b*, generates the recognition model 610 using the images of the person obtained from the user, and transmits the generated recognition model 610 to the cameras 10*a*, 10*b*, and 10*c*. The data circulation service server 20*a* may entrust an external contractor to generate the recognition model 610. In the present example, when the cameras 10*a*, 10*b*, and 10*c* are, for example, in-vehicle cameras installed in taxies, the recognition model 610 may be sent to a taxi company managing these taxies, and the taxi company may transmit the recognition model 610 to the cameras 10*a*, 10*b*, and 10*c*.

Subsequently, the cameras 10*a*, 10*b*, and 10*c* receive the recognition model 610. The cameras 10*a*, 10*b*, and 10*c* capture an image of the surrounding environment to acquire an image. The cameras 10*a*, 10*b*, and 10*c* recognize whether the acquired image includes an image of the person, based on the received recognition model 610. When the acquired image includes an image of the person, the cameras 10*a*, 10*b*, and 10*c* transmit position information and time information of the cameras 10*a*, 10*b*, and 10*c* at the time of acquiring the image of the person, as distribution data, to the data circulation service server 20*a*. In doing so, the image of the person may be transmitted as distribution data. In this case, for privacy protection, it is preferable that information included in the distribution data is only the image of the person and does not include an image of the environment surrounding the person or an image of a person present in the surrounding of the person.

Subsequently, the data circulation service server 20*a* transmits the received distribution data to the people finding service server 20*b*. The people finding service server 20*b* transmits the received distribution data as a deliverable to the user device 30 that has made a request.

In this example, the user pays a consideration to the operator of the people finding service server 20*b*, in accordance with the deliverable. The operator of the people finding service server 20*b* pays a consideration to the operator of the data circulation service server 20*a*, in accordance with the distribution data. Further, the operator of the data circulation service server 20*a* pays a fee to the administrator (for example, taxi company) of the cameras 10*a*, 10*b*, and 10*c*, in accordance with the data use fee based on the distribution amount determined by the aggregation server 50.

4. SUM-UP

As described above, the foregoing present embodiments and modifications can construct a framework that enables various users to readily use information obtained from sensing data acquired by various sensor devices 10.

5. HARDWARE CONFIGURATION

Figure 13:
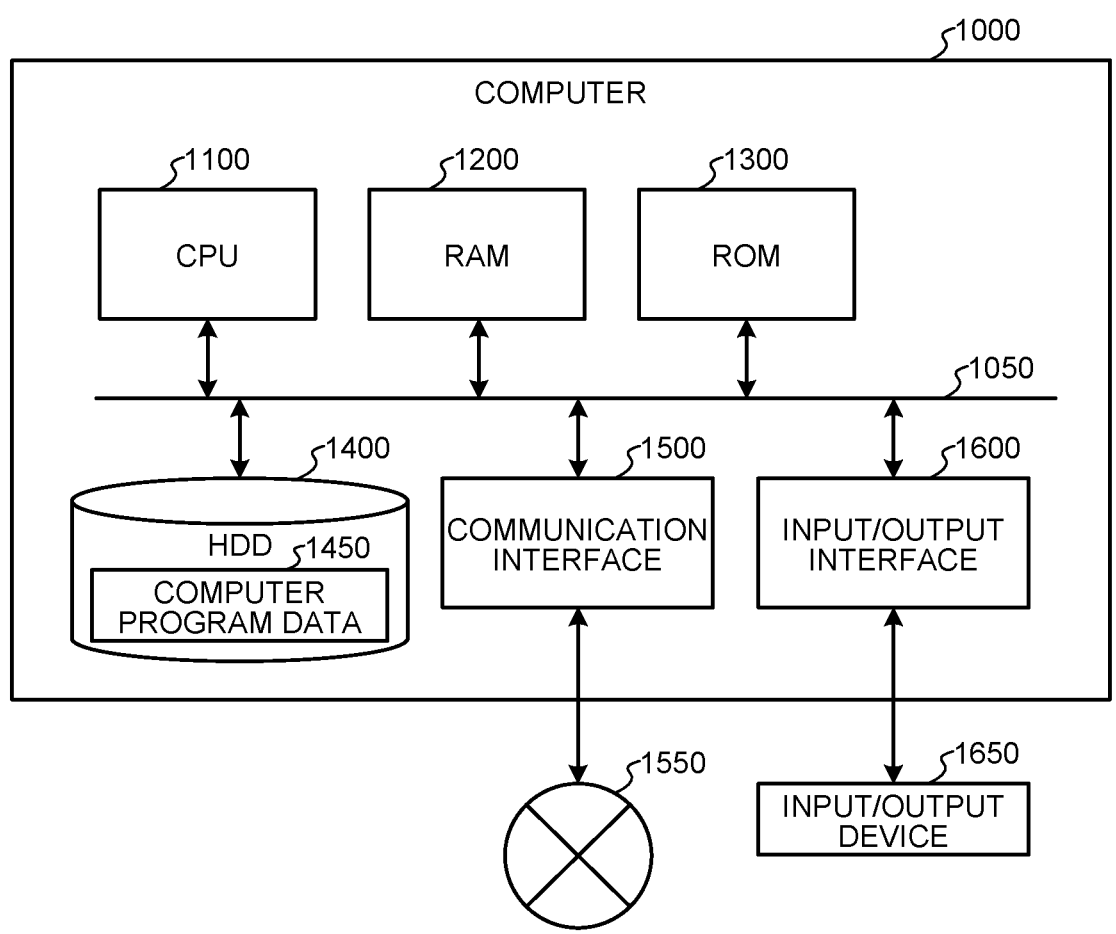
FIG. 13 is a hardware configuration diagram illustrating an example of a computer implementing the functions of the service server 20.

An information processing device such as the sensor device 10 and the service server 20 according to the foregoing embodiments is implemented, for example, by a computer 1000 having a configuration as illustrated in FIG. 13. A description will be given below with the sensor device 10 and the service server 20 according to the embodiments of the present disclosure as an example. FIG. 13 is a hardware configuration diagram illustrating an example of the computer 1000 implementing the functions of the sensor device 10 and the service server 20. The computer 1000 includes a CPU 1100, a RAM 1200, a ROM 1300, an HDD 1400, a communication interface 1500, and an input/output interface 1600. The units of the computer 1000 are connected by a bus 1050.

The CPU 1100 operates based on a computer program stored in the ROM 1300 or the HDD 1400 and performs control of each unit. For example, the CPU 1100 loads a computer program stored in the ROM 1300 or the HDD 1400 into the RAM 1200 and performs processes corresponding to a variety of computer programs.

The ROM 1300 stores, for example, a boot program such as the basic input/output system (BIOS) executed by the CPU 1100 at startup of the computer 1000 and a computer program dependent on the hardware of the computer 1000.

The HDD 1400 is a computer-readable recording medium that stores a computer program executed by the CPU 1100 and data used by such a computer program, in a non-transient manner. Specifically, the HDD 1400 is a recording medium that stores an information processing program and an app according to the present disclosure as an example of computer program data 1450.

The communication interface 1500 is an interface for the computer 1000 to connect to an external network 1550 (for example, the Internet). For example, the CPU 1100 receives data from another device or transmits data generated by the CPU 1100 to another device, through the communication interface 1500.

The input/output interface 1600 is an interface for connecting an input/output device 1650 to the computer 1000. For example, the CPU 1100 receives data from an input device such as a keyboard and a mouse through the input/ output interface 1600. The CPU 1100 transmits data to an output device such as a display, a speaker, and a printer through the input/output interface 1600. The input/output interface 1600 may function as a media interface for reading a computer program and the like stored in a predetermined recording medium (media). Examples of the media include optical recording media such as digital versatile discs (DVD) and phase change rewritable disks (PD), magneto-optical recording media such as magneto-optical (MO) disks, tape media, magnetic recording media, and semiconductor memories.

For example, when the computer 1000 functions as the service server 20 according to the embodiments of the present disclosure, the CPU 1100 of the computer 1000 executes a computer program stored in the RAM 1200 to implement the functions such as the processing unit 230. The HDD 1400 stores the information processing program and the like according to the present disclosure. The CPU 1100 reads computer program data 1450 from the HDD 1400 for execution. As another example, these computer programs may be acquired from another device through the external network 1550.

The information processing device according to the present embodiment may be applied to a system including a plurality of devices supposed to be connected to a network (or communicate between the devices), for example, like cloud computing. In other words, the information processing device according to the foregoing present embodiment can be implemented, for example, as an information processing system in which a plurality of devices perform a process related to the information processing method according to the present embodiment.

6. APPLICATION TO MOVABLE BODY

The technique according to the present disclosure (the present technique) is applicable to a variety of products. For example, the technique according to the present disclosure may be implemented as a device mounted on any type of movable bodies, such as automobiles, electric cars, hybrid electric cars, motorcycles, bicycles, personal mobility devices, airplanes, drones, vessels and ships, and robots.

Figure 14:
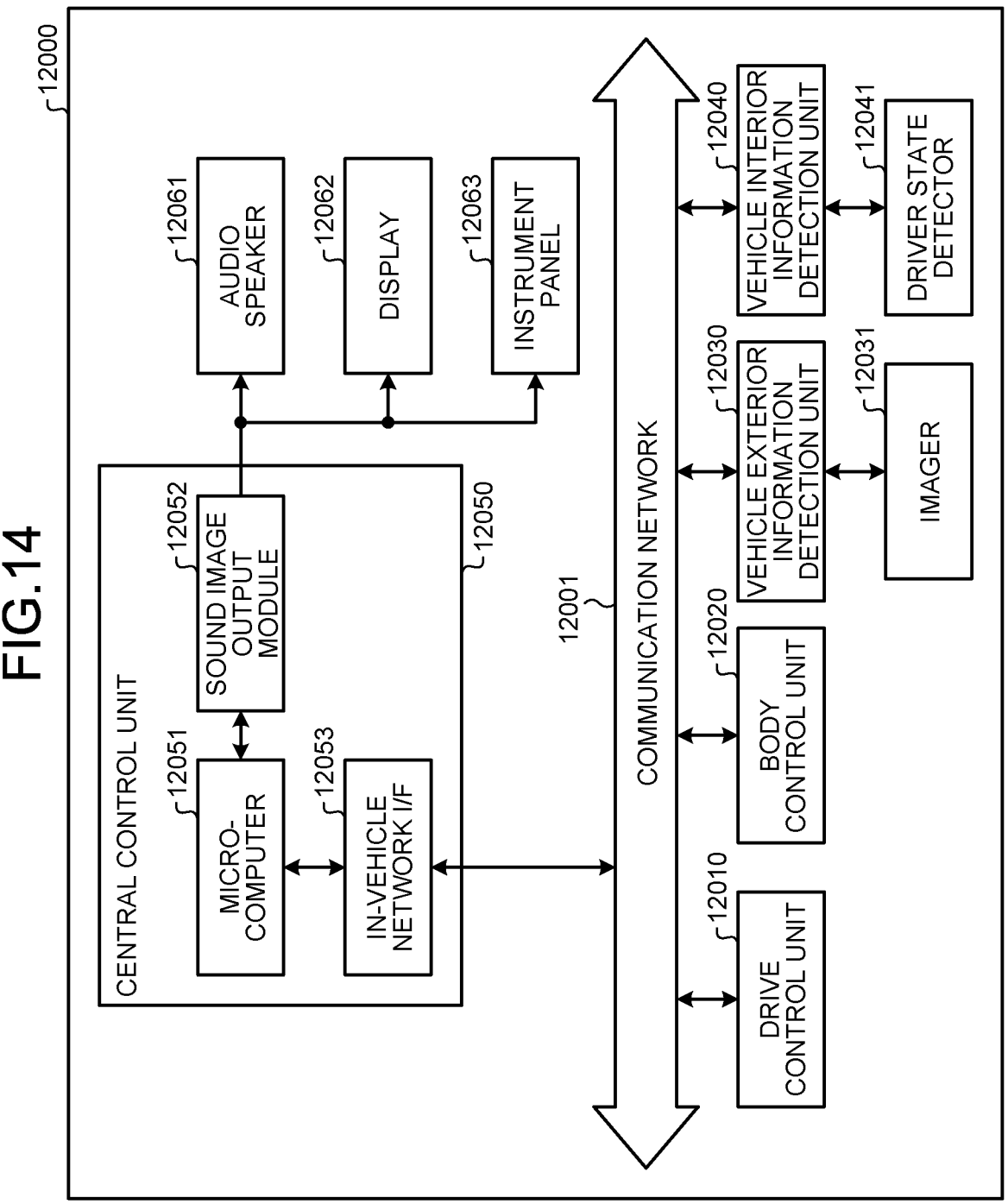
FIG. 14 is a block diagram illustrating an example of the overall configuration of a vehicle control system.

FIG. 14 is a block diagram illustrating an example of the overall configuration of a vehicle control system that is an example of a movable body control system to which the technique according to the present disclosure is applicable.

A vehicle control system 12000 includes a plurality of electronic control units connected through a communication network 12001. In the example illustrated in FIG. 14, the vehicle control system 12000 includes a drive control unit 12010, a body control unit 12020, a vehicle exterior information detection unit 12030, a vehicle interior information detection unit 12040, and a central control unit 12050. As a functional configuration of the central control unit 12050, a microcomputer 12051, a sound image output module 12052, and an in-vehicle network I/F (interface) 12053 are illustrated.

The drive control unit 12010 controls operation of devices related to a drive system of a vehicle in accordance with a variety of computer programs. For example, the drive control unit 12010 functions as a control device for a drive force generating device for generating drive force of the vehicle, such as an internal combustion engine or a drive motor, a drive force transmission mechanism for transmitting drive force to the wheels, a steering mechanism for adjusting the steering angle of the vehicle, and a braking device for generating braking force of the vehicle.

The body control unit 12020 controls operation of a variety of devices installed in the vehicle body in accordance with a variety of computer programs. For example, the body control unit 12020 functions as a control device for a keyless entry system, a smart key system, a power window device, or a variety of lamps such as head lamps, rear lamps, brake lamps, turn signals, and fog lamps. In this case, the body control unit 12020 may receive radio waves transmitted from a portable device alternative to a key or signals from a variety of switches. The body control unit 12020 accepts input of the radio waves or signals and controls a door lock device, a power window device, a lamp, and the like of the vehicle.

The vehicle exterior information detection unit 12030 detects information on the outside of the vehicle equipped with the vehicle control system 12000. For example, an imager 12031 is connected to the vehicle exterior information detection unit 12030. The vehicle exterior information detection unit 12030 allows the imager 12031 to capture an image of the outside of the vehicle and receives the captured image. The vehicle exterior information detection unit 12030 may perform an object detection process or a distance detection process for persons, vehicles, obstacles, signs, or characters on roads, based on the received image.

The imager 12031 is an optical sensor that receives light and outputs an electrical signal corresponding to the quantity of received light of the light. The imager 12031 may output an electrical signal as an image or output as information on a measured distance. Light received by the imager 12031 may be visible light or invisible light such as infrared rays.

The vehicle interior information detection unit 12040 detects information on the inside of the vehicle. The vehicle interior information detection unit 12040 is connected to, for example, a driver state detector 12041 that detects a state of the driver. The driver state detector 12041 includes, for example, a camera for capturing an image of the driver, and the vehicle interior information detection unit 12040 may calculate the degree of fatigue or the degree of concentration of the driver or may determine whether the driver falls asleep, based on detection information input from the driver state detector 12041.

The microcomputer 12051 can compute a control target value for the drive force generating device, the steering mechanism, or the braking device, based on information on the inside and outside of the vehicle acquired by the vehicle exterior information detection unit 12030 or the vehicle interior information detection unit 12040, and output a control command to the drive control unit 12010. For example, the microcomputer 12051 can perform coordination control for the purpose of function implementation of advanced driver assistance systems (ADAS), including collision avoidance or shock mitigation of the vehicle, car-following drive based on the distance between vehicles, vehicle speed-keeping drive, vehicle collision warning, and lane departure warning.

The microcomputer 12051 can perform coordination control for the purpose of, for example, autonomous driving, in which the drive force generating device, the steering mechanism, or the braking device is controlled based on information on the surroundings of the vehicle acquired by the vehicle exterior information detection unit 12030 or the vehicle interior information detection unit 12040 to enable autonomous driving without depending on the operation by the driver.

The microcomputer 12051 can output a control command to the body control unit 12020, based on information on the outside of the vehicle acquired by the vehicle exterior information detection unit 12030. For example, the microcomputer 12051 can perform coordination control for the antidazzle purpose, for example, by controlling the head lamps in accordance with the position of a vehicle ahead or an oncoming vehicle detected by the vehicle exterior information detection unit 12030 to switch high beams to low beams.

The sound image output module 12052 transmits an output signal of at least one of sound and image to an output device capable of visually or aurally giving information to a passenger in the vehicle or the outside of the vehicle. In the example in FIG. 14, an audio speaker 12061, a display 12062, and an instrument panel 12063 are illustrated as the output device. The display 12062 may include, for example, at least one of an on-board display and a head-up display.

Figure 15:
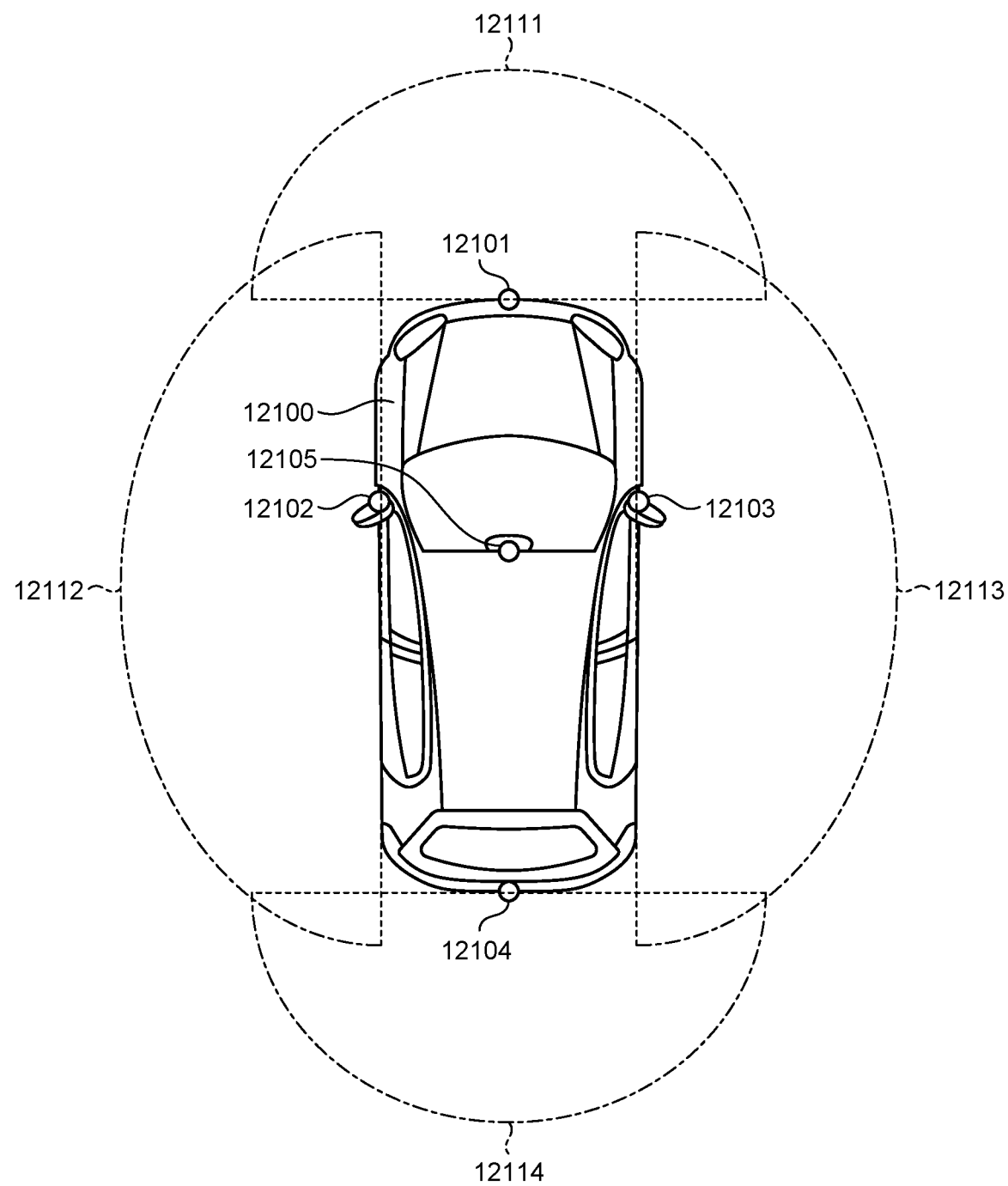
FIG. 15 is a diagram illustrating an example of the installation position of a vehicle-exterior information detector and an imager.

FIG. 15 is a diagram illustrating an example of the installation position of the imager 12031.

In FIG. 15, imagers 12101, 12102, 12103, 12104, and 12105 are provided as the imager 12031.

The imagers 12101, 12102, 12103, 12104, and 12105 are provided, for example, at positions such as front nose, side mirrors, rear bumper, and back door of the vehicle 12100, and an upper portion of the front glass inside the vehicle. The imager 12101 provided at the front nose and the imager 12105 provided at the upper portion of the front glass inside the vehicle mainly acquire an image in front of the vehicle 12100. The imagers 12102 and 12103 provided at the side mirrors mainly acquire images on the sides of the vehicle 12100. The imager 12104 provided at the rear bumper or the back door mainly acquires an image behind the vehicle 12100. The imager 12105 provided at the upper portion of the front glass in the vehicle interior is mainly used for detecting a vehicle ahead, pedestrians, obstacles, traffic signs, road signs, traffic lanes, and the like.

FIG. 15 illustrates an example of the imaging ranges of the imagers 12101 and 12104. An imaging range 12111 indicates an imaging range of the imager 12101 provided at the front nose, imaging ranges 12112 and 12113 indicate the imaging ranges of the imagers 12102 and 12103 provided at the side mirrors, and an imaging range 12114 indicates the imaging range of the imager 12104 provided at the rear bumper or the back door. For example, a bird's eye view of the vehicle 12100 viewed from above can be obtained by superimposing image data captured by the imagers 12101 and 12104.

At least one of the imagers 12101 and 12104 may have a function of acquiring distance information. For example, at least one of the imagers 12101 and 12104 may be a stereo camera including a plurality of image sensors or may be an image sensor having a pixel for phase difference detection.

For example, the microcomputer 12051 can obtain the distance to a three-dimensional object within the imaging range 12111 or 12114 and a temporal change of this distance (relative speed to the vehicle 12100), based on distance information obtained from the imager 12101 or 12104, to specifically extract, as a vehicle ahead, a three-dimensional object closest to the vehicle 12100 on the path of travel and traveling at a predetermined speed (for example, 0 km/h or more) in substantially the same direction as the vehicle 12100. In addition, the microcomputer 12051 can preset a distance between vehicles to be kept in front of a vehicle ahead and perform, for example, automatic braking control (including car-following stop control) and automatic speed-up control (including car-following startup control). In this way, coordination control can be performed, for example, for the purpose of autonomous driving in which the vehicle runs autonomously without depending on the operation by the driver.

For example, the microcomputer 12051 can classify three-dimensional object data on a three-dimensional object into two-wheel vehicle, standard-sized vehicle, heavy vehicle, pedestrian, utility pole, or any other three-dimensional object, based on the distance information obtained from the imager 12101 or 12104, and can use the extracted data for automatic avoidance of obstacles. For example, the microcomputer 12051 identifies an obstacle in the surroundings of the vehicle 12100 as an obstacle visible to the driver of the vehicle 12100 or as an obstacle hardly visible. The microcomputer 12051 then determines a collision risk indicating the degree of risk of collision with each obstacle and, when the collision risk is equal to or higher than a setting value and there is a possibility of collision, outputs an alarm to the driver through the audio speaker 12061 or the display 12062, or performs forced deceleration or avoidance steering through the drive control unit 12010, thereby implementing drive assistance for collision avoidance.

At least one of the imagers 12101 and 12104 may be an infrared camera that detects infrared rays. For example, the microcomputer 12051 can recognize a pedestrian by determining whether a pedestrian exists in the captured image by the imager 12101 or 12104. Such recognition of pedestrians is performed, for example, through the procedure of extracting feature points in the captured image by the imager 12101 or 12104 serving as an infrared camera and the procedure of performing pattern matching with a series of feature points indicating the outline of an object to determine whether the object is a pedestrian. When the microcomputer 12051 determines that a pedestrian exists in the captured image by the imager 12101 or 12104 and recognizes a pedestrian, the sound image output module 12052 controls the display 12062 such that a rectangular outline for highlighting the recognized pedestrian is superimposed. The sound image output module 12052 may control the display 12062 such that an icon indicating a pedestrian appears at a desired position.

An example of the vehicle control system to which the technique according to the present disclosure is applicable has been described above. The technique according to the present disclosure can be applied using the imager 12031 in the configuration described above as the sensor device 10.

7. SUPPLEMENTAL REMARKS

The embodiments of the present disclosure described above may include, for example, a computer program for causing a computer to function as the sensor device 10, the service server 20, the user device 30, and the aggregation server 50 according to the present embodiment and a non-transient tangible medium encoded with the computer program. The computer program may be distributed through a communication circuit (including wireless communication) such as the Internet.

The steps in the information processing in the foregoing embodiments are not necessarily processed in the specified order. For example, the steps may be processed in the order changed as appropriate. The steps may be processed partially concurrently or discretely, rather than being processed in chronological order. The steps are not necessarily processed in accordance with the specified method but, for example, may be processed by another functional unit by any other methods.

Although preferred embodiments of the present disclosure have been described in detail above with reference to the accompanying drawings, the technical scope of the present disclosure is not limited to such examples. It is obvious that one having ordinary knowledge in the technical field of the present disclosure would conceive a variety of changes and modifications without departing from the technical idea recited in the claims, and it should be understood that these changes and modifications fall within the technical scope of the present disclosure as a matter of course.

The effects described in the present description are merely explanatory or illustrative and are not intended to be limitative. The technique according to the present disclosure may achieve other effects apparent to those skilled in the art from the disclosure in the present description, in addition to or instead of the effects described above.

The present technique may have a configuration as described below.

(1)

A data distribution system comprising:
one or more sensor devices configured to acquire sensing data; and
a server configured to accept a distribution request from one or more requestors requesting distribution of predetermined data capable of being generated from the sensing data,
the sensor device including
a sensor unit configured to acquire the sensing data,
a model acquirer configured to acquire, from the server, a recognition model corresponding to the distribution request,
a recognizer configured to recognize whether the acquired sensing data is applicable to the distribution request, based on the recognition model,
a data generator configured to, when the sensing data is applicable to the distribution request, perform a process in accordance with the distribution request for the sensing data and generate the predetermined data, and
a sensor device side distributor configured to distribute the predetermined data,
the server including
a request acceptor configured to accept the distribution request from the one or more requestors,
a model generator configured to generate the recognition model corresponding to the distribution request, and
a model transmitter configured to transmit the generated recognition model to the sensor device.

(2)

The data distribution system according to (1), wherein the model generator performs machine learning with a plurality of training data related to an object specified by the distribution request to generate the recognition model for recognizing the object included in the sensing data.

(3)

The data distribution system according to (2), wherein the sensor device further includes a preprocessor configured to preprocess the sensing data in accordance with the recognition model and output the preprocessed sensing data to the recognizer.

(4)

The data distribution system according to (2) or (3), wherein the data generator extracts only the predetermined data from the sensing data in accordance with the distribution request.

(5)

The data distribution system according to (4), wherein the predetermined data includes at least one of attribute information, quantity information, position information, state information, operation information, surrounding environment information, and prediction information of the object.

(6)

The data distribution system according to any one of (2) to (5), wherein the distribution request includes object information about the object, data format information about the predetermined data, and identification information of the requestor.

(7)

The data distribution system according to any one of (1) to (6), wherein the sensor device side distributor distributes the predetermined data to the requestor.

(8)

The data distribution system according to any one of (1) to (6), wherein
the server further includes a server side distributor configured to distribute the predetermined data to the requestor, and
the sensor device side distributor distributes the predetermined data to the server.

(9)

The data distribution system according to any one of (1) to (8), wherein
the recognizer includes a plurality of recognition nodes coupled to be able to communicate with each other and cooperating to perform recognition hierarchically,
the recognition nodes at least include
a first node receiving the sensing data to perform computation based on a feature of the received sensing data and outputting a first recognition result,
a second node receiving the first recognition result to perform computation based on a feature of the received first recognition result and outputting a second recognition result, and
a third node receiving the second recognition result to perform computation based on a feature of the received second recognition result and outputting a third recognition result, and
the first to the third nodes dynamically change the volume of computation to perform, based on control data included in the recognition model transmitted to each of the first to the third nodes.

(10)

The data distribution system according to (9), wherein
the first node outputs the first recognition result in accordance with a computation ability of the second node, and
the second node outputs the second recognition result in accordance with a computation ability of the third node.

(11)

The data distribution system according to (9) or (10), wherein at least one of the first and the second recognition results is output together with metadata describing a recognition result at a present layer.

(12)

The data distribution system according to any one of (1) to (11), wherein the sensor device is at least one of an imaging device, a depth sensor, a sound collecting device, a thermometer, a hygrometer, and a water level indicator.

(13)

The distribution system according to any one of (1) to (11), wherein the sensor device is an imaging device installed in a movable body.

(14)

The data distribution system according to any one of (1) to (13), wherein
the sensor device further includes a positioning unit, the positioning unit acquires positioning data of the sensor device at a time when the sensing data applicable to the distribution request is acquired, and the sensor device side distributor distributes the predetermined data together with the positioning data.

(15)

The data distribution system according to any one of (1) to (14), wherein the server further includes an ability information acquirer configured to acquire ability information indicating ability of the sensor device, and the model generator generates the recognition model, based on the ability information.

(16)

The data distribution system according to any one of (1) to (15), further comprising an aggregation server, wherein the sensor device further includes an aggregator configured to aggregate a distribution amount of the predetermined data for each of the requestors and generate aggregated information and an aggregated information transmitter configured to transmit the aggregated information to the aggregation server, and the aggregation server further includes an aggregated information acquirer configured to acquire the aggregated information from the sensor device and a fee processor configured to determine a data use fee based on the aggregated information and exchange the data use fee between an administrator of the sensor device and each requestor.

(17)

The data distribution system according to (16), wherein the aggregated information transmitter transmits, as the aggregated information, at least one of a date and time when the sensing data corresponding to the predetermined data is acquired, the distribution amount of the predetermined data, a data format of the predetermined data, identification information of the requestor of the predetermined data, identification information of the sensor device, and identification of an administrator of the sensor device.

(18)

The data distribution system according to (17), wherein the fee processor determines the data use fee, based on at least one of the distribution amount and the data format.

(19)

A sensor device comprising:

a sensor unit configured to acquire sensing data;

a model acquirer configured to acquire a recognition model corresponding to a distribution request, from a server accepting the distribution request from one or more requestors requesting distribution of predetermined data capable of being generated from the sensing data;

a recognizer configured to recognize whether the acquired sensing data is applicable to the distribution request, based on the recognition model;

a data generator configured to, when the sensing data is applicable to the distribution request, perform a process in accordance with the distribution request for the sensing data and generate the predetermined data; and a sensor device side distributor configured to distribute the predetermined data.

(20)

A server comprising:

a request acceptor configured to accept a distribution request from a requestor requesting distribution of predetermined data;

a model generator configured to generate a recognition model for recognizing, in a sensor device, whether sensing data acquired by the sensor device is applicable to the distribution request; and a model transmitter configured to transmit the generated recognition model to the sensor device.

REFERENCE SIGNS LIST 1, 1a, 1b data distribution system
10, 10a, 10b, 10c sensor device
20, 20a, 20b service server
30, 30a, 30b, 30c user device
40 authentication server
50 aggregation server
100 sensor unit
110 positioning unit
130, 230, 530 processing unit
132, 232 ID transmitter
134 key receiver
136 sensor data acquirer
138 preprocessor
140 model acquirer
142 recognizer
142a input layer
142b intermediate layer
142c output layer
144 data generator
146, 246 distributor
148 aggregator
150 aggregated information transmitter
160, 260, 560 storage unit
170, 270, 570 communication unit
234 request acceptor
236 ability information acquirer
238 model generator
238a learner
240 model transmitter
242 data acquirer
532 aggregated information acquirer
534 fee processor
600 object
602 training data
610 recognition model

The invention claimed is:

1. A data distribution system comprising:

one or more sensor devices configured to acquire sensing data; and a server configured to accept a distribution request from one or more requestors requesting distribution of predetermined data capable of being generated from the sensing data;

the sensor device including a sensor unit configured to acquire the sensing data, a model acquirer configured to acquire, from the server, a recognition model corresponding to the distribution request, a recognizer configured to recognize whether the sensing data is applicable to the distribution request, based on the recognition model, a data generator configured to, when the sensing data is applicable to the distribution request, perform a process in accordance with the distribution request for the sensing data and generate the predetermined data, and a sensor device side distributor configured to distribute the predetermined data;

the server including
a request acceptor configured to accept the distribution request from the one or more requestors,
a model generator configured to generate the recognition model corresponding to the distribution request, and
a model transmitter configured to transmit the generated recognition model to the sensor device; wherein
the recognizer includes a plurality of recognition nodes configured to cooperate to perform recognition hierarchically,
the recognition nodes including
a first node receiving the sensing data to perform computation based on a feature of the received sensing data and outputting a first recognition result,
a second node receiving the first recognition result to perform computation based on a feature of the received first recognition result and outputting a second recognition result, and
a third node receiving the second recognition result to perform computation based on a feature of the received second recognition result and outputting a third recognition result, wherein
the first to the third nodes dynamically change an amount of computation to perform, based on control data included in the recognition model for each of the first to the third nodes.

2. The data distribution system according to claim 1, wherein
the model generator performs machine learning with a plurality of training data related to an object specified by the distribution request to generate the recognition model for recognizing the object included in the sensing data.

3. The data distribution system according to claim 2, wherein
the sensor device further includes a preprocessor configured to preprocess the sensing data in accordance with the recognition model and output the preprocessed sensing data to the recognizer.

4. The data distribution system according to claim 2, wherein
the data generator extracts only the predetermined data from the sensing data in accordance with the distribution request.

5. The data distribution system according to claim 4, wherein
the predetermined data includes at least one of attribute information, quantity information, position information, state information, operation information, surrounding environment information, and prediction information of the object.

6. The data distribution system according to claim 2, wherein
the distribution request includes object information about the object, data format information about the predetermined data, and identification information of the requestor.

7. The data distribution system according to claim 1, wherein the distribution request includes a first information used by the recognizer and a second information used by the data generator.

8. The data distribution system according to claim 1, wherein
the server further includes a server side distributor configured to distribute the predetermined data to the requestor, and the sensor device side distributor distributes the predetermined data to the server.

9. The data distribution system according to claim 1, wherein
the first node outputs the first recognition result in accordance with a computation ability of the second node, and
the second node outputs the second recognition result in accordance with a computation ability of the third node.

10. The data distribution system according to claim 1, wherein
at least one of the first and the second recognition results is output together with metadata describing a recognition result.

11. The data distribution system according to claim 1, wherein
the sensor device is at least one of an imaging device, a depth sensor, a sound collecting device, a thermometer, a hygrometer, and a water level indicator.

12. The distribution system according to claim 1, wherein the sensor device side distributor distributes the predetermined data only when the sensing data is applicable to the distribution request.

13. The data distribution system according to claim 1, wherein
the sensor device further includes a positioning unit,
the positioning unit acquires positioning data of the sensor device at a time when the sensing data applicable to the distribution request is acquired, and
the sensor device side distributor distributes the predetermined data together with the positioning data.

14. The data distribution system according to claim 1, wherein
the server further includes an ability information acquirer configured to acquire ability information indicating ability of the sensor device, and
the model generator generates the recognition model, based on the ability information.

15. The data distribution system according to claim 1, wherein the control data comprises a weight of the amount of computation.

16. A data distribution system comprising:
one or more sensor devices configured to acquire sensing data;
a server configured to accept a distribution request from one or more requestors requesting distribution of predetermined data capable of being generated from the sensing data;
the sensor device including
a sensor unit configured to acquire the sensing data,
a model acquirer configured to acquire, from the server, a recognition model corresponding to the distribution request,
a recognizer configured to recognize whether the sensing data is applicable to the distribution request, based on the recognition model,
a data generator configured to, when the sensing data is applicable to the distribution request, perform a process in accordance with the distribution request for the sensing data and generate the predetermined data, and
a sensor device side distributor configured to distribute the predetermined data;
the server including
a request acceptor configured to accept the distribution request from the one or more requestors, a model generator configured to generate the recognition model corresponding to the distribution request, and
a model transmitter configured to transmit the generated recognition model to the sensor device; and
an aggregation server, wherein
the sensor device further includes
an aggregator configured to aggregate a distribution amount of the predetermined data for each of the requestors and generate aggregated information, and
an aggregated information transmitter configured to transmit the aggregated information to the aggregation server; and
the aggregation server further includes
an aggregated information acquirer configured to acquire the aggregated information from the sensor device, and
a fee processor configured to determine a data use fee based on the aggregated information and exchange the data use fee between an administrator of the sensor device and each requestor.

17. The data distribution system according to claim 16, wherein
the aggregated information transmitter transmits,
as the aggregated information,
at least one of a date and time when the sensing data corresponding to the predetermined data is acquired, the distribution amount of the predetermined data, a data format of the predetermined data, identification information of the requestor of the predetermined data, identification information of the sensor device, and identification of an administrator of the sensor device.

18. The data distribution system according to claim 17, wherein the model generator is located in a device that is separate from the request acceptor.

19. A sensor device comprising:
a memory storing a program, and
a processor configured to execute the program to perform operations comprising:
acquiring sensing data from a sensor;
acquiring a recognition model corresponding to a distribution request, from a server accepting the distribution request from one or more requestors requesting distribution of predetermined data capable of being generated from the sensing data;
recognizing whether the sensing data is applicable to the distribution request, based on the recognition model;
when the sensing data is applicable to the distribution request, performing a process in accordance with the distribution request for the sensing data and generating the predetermined data;
distributing the predetermined data; and
recognizing whether the sensing data is applicable to the distribution request uses a plurality of recognition nodes configured to cooperate to perform recognition hierarchically,
the recognition nodes including a first node, a second node and a third node,
the first node receiving the sensing data to perform computation based on a feature of the sensing data and outputting a first recognition result,
the second node receiving the first recognition result to perform computation based on a feature of the first recognition result and outputting a second recognition result, and
the third node receiving the second recognition result to perform computation based on a feature of the second recognition result and outputting a third recognition result, wherein
the first to the third nodes dynamically change an amount of computation to perform, based on control data included in the recognition model for each of the first to the third nodes.

20. The sensor device according to claim 19, wherein
the first node outputs the first recognition result in accordance with a computation ability of the second node, and
the second node outputs the second recognition result in accordance with a computation ability of the third node.

21. The sensor device according to claim 19, wherein at least one of the first and the second recognition results is output together with metadata describing a recognition result.

22. The sensor device according to claim 19, wherein the control data comprises a weight of the amount of computation.

23. A non-transitory computer readable medium storing program code, the program code being executable by a processor to perform operations comprising:
acquiring sensing data from a sensor;
acquiring a recognition model corresponding to a distribution request, from a server accepting the distribution request from one or more requestors requesting distribution of predetermined data capable of being generated from the sensing data;
recognizing whether the sensing data is applicable to the distribution request, based on the recognition model;
when the sensing data is applicable to the distribution request, performing a process in accordance with the distribution request for the sensing data and generating the predetermined data;
distributing the predetermined data; and
recognizing whether the sensing data is applicable to the distribution request uses a plurality of recognition nodes configured to cooperate to perform recognition hierarchically,
the recognition nodes including a first node, a second node and a third node,
the first node receiving the sensing data to perform computation based on a feature of the sensing data and outputting a first recognition result,
the second node receiving the first recognition result to perform computation based on a feature of the first recognition result and outputting a second recognition result, and
the third node receiving the second recognition result to perform computation based on a feature of the second recognition result and outputting a third recognition result, wherein
the first to the third nodes dynamically change an amount of computation to perform, based on control data included in the recognition model for each of the first to the third nodes.

24. The non-transitory computer readable medium according to claim 23, wherein
the first node outputs the first recognition result in accordance with a computation ability of the second node, and
the second node outputs the second recognition result in accordance with a computation ability of the third node.

25. The non-transitory computer readable medium according to claim 23, wherein at least one of the first and the second recognition results is output together with metadata describing a recognition result.

26. The non-transitory computer readable medium according to claim 23, wherein the control data comprises a weight of the amount of computation.

* * * * *